(12) United States Patent
Hatakeyama

(10) Patent No.: US 10,911,701 B2
(45) Date of Patent: Feb. 2, 2021

(54) IMAGE PICKUP APPARATUS AND IMAGE PICKUP METHOD

(71) Applicant: Olympus Corporation, Hachioji (JP)

(72) Inventor: Ryo Hatakeyama, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/457,864

(22) Filed: Jun. 28, 2019

(65) Prior Publication Data
US 2019/0327434 A1 Oct. 24, 2019

Related U.S. Application Data

(63) Continuation of application No. PCT/JP2017/038461, filed on Oct. 25, 2017.

(30) Foreign Application Priority Data

Jan. 10, 2017 (JP) ................................. 2017-001882

(51) Int. Cl.
*H04N 5/369* (2011.01)
*H04N 5/347* (2011.01)
*H04N 9/04* (2006.01)

(52) U.S. Cl.
CPC ........... *H04N 5/3696* (2013.01); *H04N 5/347* (2013.01); *H04N 9/045* (2013.01)

(58) Field of Classification Search
CPC ...... H04N 5/3696; H04N 5/347; H04N 9/045; H04N 5/232122; H04N 9/0451;
(Continued)

(56) References Cited

U.S. PATENT DOCUMENTS

2013/0076972 A1* 3/2013 Okita ................. H04N 5/23212
 348/360
2013/0107067 A1* 5/2013 Miyakoshi ............. H04N 5/345
 348/208.5
(Continued)

FOREIGN PATENT DOCUMENTS

CN 103095985 A 5/2013
JP 2015-173387 A 10/2015
(Continued)

OTHER PUBLICATIONS

International Search Report from corresponding International Application No. PCT/JP2017/038461, dated Jan. 16, 2018 (1 pg.), with translation (1 pg.).
(Continued)

*Primary Examiner* — Nhan T Tran
(74) *Attorney, Agent, or Firm* — John C. Pokotylo; Pokotylo Patent Services

(57) ABSTRACT

An image pickup apparatus includes: a pixel portion where pixels of a plurality of colors are arranged in a first direction and a second direction as repetition of a basic array, and an arbitrary pixel is divided into a plurality of divided pixels in the first direction; a mixing portion configured to generate processed pixel signals from image data generated by all divided pixels existing in the pixel portion by performing pixel reduction of a plurality of divided pixel signals related to a same color and a same division position; and a managing/instructing portion configured to, in a case of prioritizing phase difference detection, control the pixel reduction by the mixing portion so that the processed pixel signals are not arranged at regular intervals in the second direction.

13 Claims, 22 Drawing Sheets

(58) Field of Classification Search
CPC ........ H04N 9/04557; H04N 9/07; G02B 7/34; G03B 13/36
See application file for complete search history.

(56) References Cited

U.S. PATENT DOCUMENTS

| | | | | |
|---|---|---|---|---|
| 2015/0009383 | A1* | 1/2015 | Fujii | H01L 27/14627 |
| | | | | 348/302 |
| 2015/0281608 | A1 | 10/2015 | Miyahara | |
| 2016/0344922 | A1* | 11/2016 | Aoki | H04N 9/045 |
| 2017/0099449 | A1* | 4/2017 | Kang | H04N 5/36961 |
| 2018/0109726 | A1* | 4/2018 | Takayama | H04N 5/72 |

FOREIGN PATENT DOCUMENTS

| | | |
|---|---|---|
| JP | 2015-195550 A | 11/2015 |
| JP | 2016-213757 A | 12/2016 |

OTHER PUBLICATIONS

First Office Action from corresponding Chinese Patent Application U.S. Appl. No. 201780082457.3, dated Oct. 30, 2020, (7 pgs.).

* cited by examiner

| REMARKS | | | PROCESSING FOR AF | | PROCESSING FOR STILL IMAGE | | PROCESSING FOR MOVIE | | PROCESSING FOR LV | |
|---|---|---|---|---|---|---|---|---|---|---|
| | | | PRIORITIZE PHASE DIFFERENCE DETECTION | | PHASE DIFFERENCE DETECTION NOT REQUIRED (PRIORITIZE IMAGE QUALITY) | | PRIORITIZE IMAGE QUALITY | | PHASE DIFFERENCE DETECTION NOT REQUIRED (PRIORITIZE IMAGE QUALITY) | |
| IMAGE DATA | | | ○ | | ○ | | ○ | | ○ | |
| DATA FOR AF | | | ○ | | × | | ○ | | × | |
| IN-DEVICE MIXING | VERTICAL MIXTURE | | Fig. 3/Fig. 4 | | — | | Fig. 14/Fig. 15 | | Fig. 11/Fig. 12/Fig. 13 | |
| | HORIZONTAL MIXTURE | | — | | — | | Fig. 9/Fig. 10 | | Fig. 6/Fig. 7/Fig. 8 | |
| | LEFT-RIGHT ADDITION | | — | | ○ | | — | | ○ | |
| MIXTING FOR IMAGE | VERTICAL MIXTURE | | — | | TURN OFF OPERATION | | — | | TURN OFF OPERATION | |
| | HORIZONTAL MIXTURE | | — | | TURN OFF OPERATION | | — | | TURN OFF OPERATION | |
| | LEFT-RIGHT ADDITION | | ○ | | TURN OFF OPERATION | | ○ | | TURN OFF OPERATION | |
| MIXTING FOR AF | VERTICAL MIXTURE | | — | | × | | TURN OFF OPERATION | | × | |
| | HORIZONTAL MIXTURE | | Fig. 6/Fig. 7/Fig. 8 | | × | | TURN OFF OPERATION | | × | |

FIG. 22

| CLASSIFICATION OF RESPECTIVE FIGURES | HORIZONTAL/VERTICAL | NUMBER OF MIXINGS | IRREGULAR INTERVALS | REGULAR INTERVALS |
|---|---|---|---|---|
| Fig. 3/Fig. 4 | VERTICAL | 3 | ○ | |
| Fig. 5 | VERTICAL | 2 | ○ | |
| Fig. 6/Fig. 7/Fig. 8 | HORIZONTAL | 3 | | ○ |
| Fig. 9/Fig. 10 | HORIZONTAL | 2 | | ○ |
| Fig. 11/Fig. 12/Fig. 13 | VERTICAL | 3 | | ○ |
| Fig. 14/Fig. 15 | VERTICAL | 2 | | ○ |

IMAGE PICKUP APPARATUS AND IMAGE PICKUP METHOD

CROSS REFERENCE TO RELATED APPLICATION

This application is a continuation application of PCT/JP2017/038461 filed on Oct. 25, 2017 and claims benefit of Japanese Application No. 2017-001882 filed in Japan on Jan. 10, 2017, the entire contents of which are incorporated herein by this reference.

BACKGROUND OF THE INVENTION

1. Field of the Invention

The present invention relates to an image pickup apparatus in which one pixel is divided into a plurality of divided pixels for phase difference detection, and an image pickup method.

2. Description of the Related Art

An image pickup device in a configuration in which one pixel is divided into a plurality of divided pixels for phase difference detection has been conventionally proposed.

Such an image pickup device is adapted to be capable of acquiring phase difference information, by providing a plurality of photodiodes (PDs) for one microlens. However, since the number of pixels increases in comparison with a configuration in which one photodiode is provided for one microlens, a readout time period for reading out all pixel signals on an image pickup device and power consumption tend to increase.

Therefore, for example, in still image shooting for which phase difference information is not required, it is performed to add divided pixel signals of divided pixels in the image pickup device to read out the divided pixel signals as a normal pixel signal. In other operation modes, it may be performed to add and read out pixel signals.

As a technique for performing addition of pixel signals in an image pickup device, for example, Japanese Patent Application Laid-Open Publication No. 2015-173387 describes an image pickup device where pixels each of which is provided with a plurality of photoelectric conversion portions and configured to accumulate a signal charge corresponding to an amount of received light are arrayed in a two-dimensional matrix, the image pickup device including: readout means configured to, at the time of reading out a signal charge from each of the pixels, read out a pixel signal corresponding a signal charge from a photoelectric conversion portion of a first number as a first pixel signal and read out a pixel signal corresponding to a signal charge from a photoelectric conversion portion of a second number as a second pixel signal, the second number being different from the first number; and addition means configured to, with a predetermined number of pixels as one first unit, add first pixel signals and second pixel signals in the first unit to obtain a first image signal.

For example, as a method for reducing the number of pixels to be read out, leaving AF information for vertical line detection (phase difference information based on left divided pixels and right divided pixels), a method in which addition, averaging, decimation or the like is performed in a vertical direction exists.

SUMMARY OF THE INVENTION

An image pickup apparatus according to one aspect of the present invention includes: a pixel portion where a plurality of kinds of pixels with different spectral characteristics are arranged in a first direction and a second direction vertical to the first direction as repetition of a basic array, and an arbitrary pixel is divided into a plurality of divided pixels at a plurality of division positions in the first direction; a pixel reducing circuit configured to reduce a number of pixels by generating processed pixel signals from image data generated by all divided pixels existing in the pixel portion by performing pixel reduction of divided pixel signals of a plurality of adjoining divided pixels related to a same kind and a same division position; and a controlling circuit configured to control the pixel reduction by the pixel reducing circuit according to whether or not to prioritize phase difference detection; and in a case of prioritizing the phase difference detection, the controlling circuit controls the pixel reducing circuit to cause the pixel reducing circuit to perform pixel reduction of divided pixel signals of a plurality of divided pixels adjoining in the second direction so that the processed pixel signals are not arranged at regular intervals in the second direction.

An image pickup method according to another aspect of the present invention includes: reducing the number of pixels by generating processed pixel signals from image data generated by all divided pixels by performing pixel reduction of divided pixel signals of a plurality of adjoining divided pixels related to a same kind and a same division position, and the image data being outputted from a pixel portion where a plurality of kinds of pixels with different spectral characteristics are arranged in a first direction and a second direction vertical to the first direction as repetition of a basic array, and an arbitrary pixel is divided into a plurality of divided pixels at a plurality of division positions in the first direction; and controlling the pixel reduction by the reducing of a number of pixels, according to whether or not to prioritize phase difference detection; and in a case of prioritizing the phase difference detection, the controlling is to control the pixel reduction to cause pixel reduction of divided pixel signals of a plurality of divided pixels adjoining in the second direction to be performed so that the processed pixel signals are not arranged at regular intervals in the second direction.

BRIEF DESCRIPTION OF THE DRAWINGS

FIG. 2 is a diagram showing a configuration of divided pixels on a pixel portion of an image pickup device of the embodiment;

FIG. 4 is a diagram showing a state in which mixed pixels obtained by the vertical three-pixel mixing prioritizing phase difference detection are not arranged at regular intervals in a vertical direction in the embodiment;

FIG. 8 is a diagram showing an example in which mixed pixels obtained by the horizontal three-pixel mixing prioritizing phase difference detection are arranged at regular intervals in a horizontal direction in the embodiment;

FIG. 21 is a table showing classification of mixing processing according to AF, still image, movie and LV in the image pickup apparatus of the embodiment; and FIG. 22 is a table showing correspondence between the mixing processing and each figure in the image pickup apparatus of the embodiment.

DETAILED DESCRIPTION OF THE PREFERRED EMBODIMENT

An embodiment of the present invention will be described below with reference to drawings.

FIGS. 1 to 22 show the embodiment of the present invention.

Figure 2:
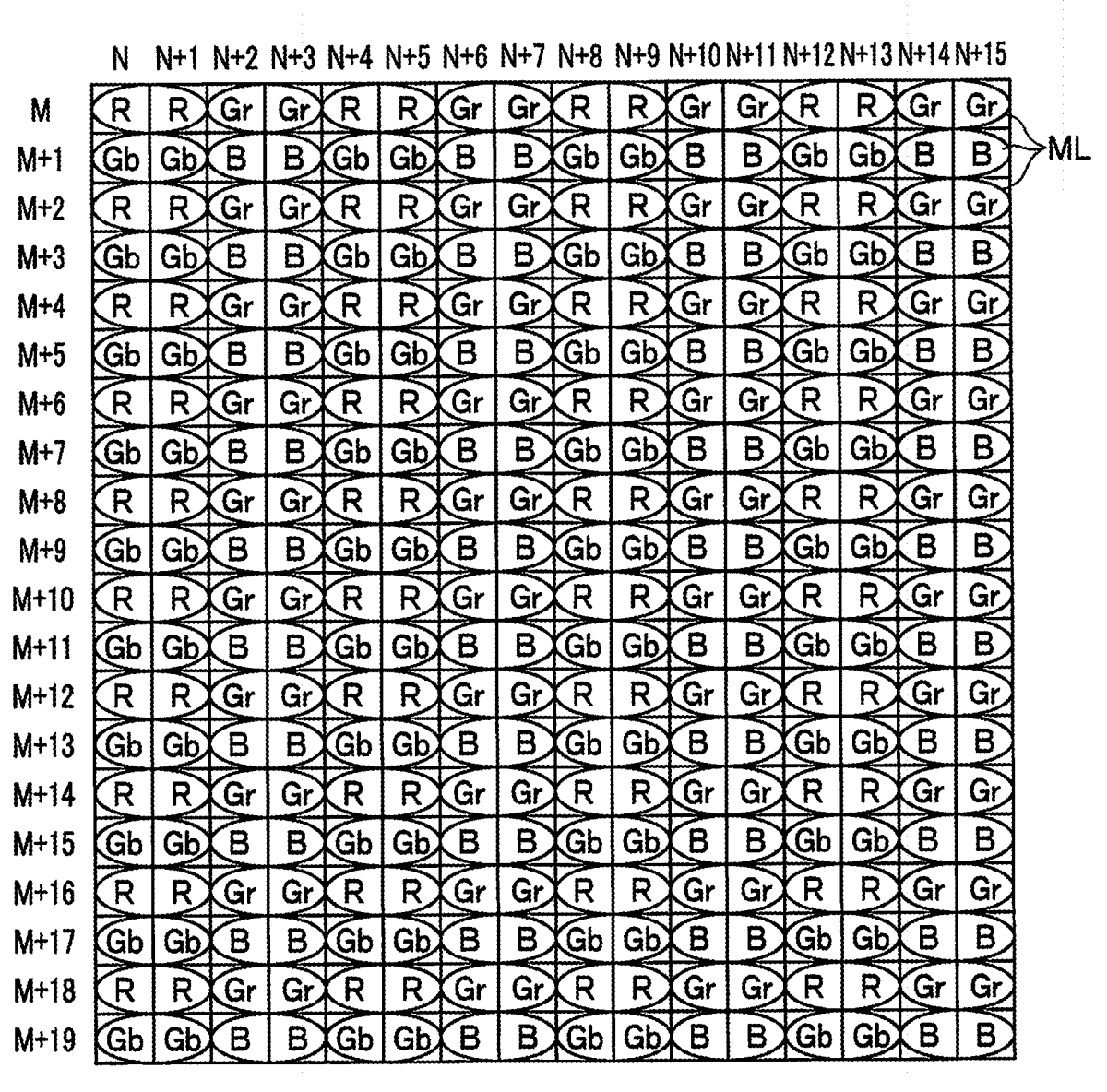
Figure 11:
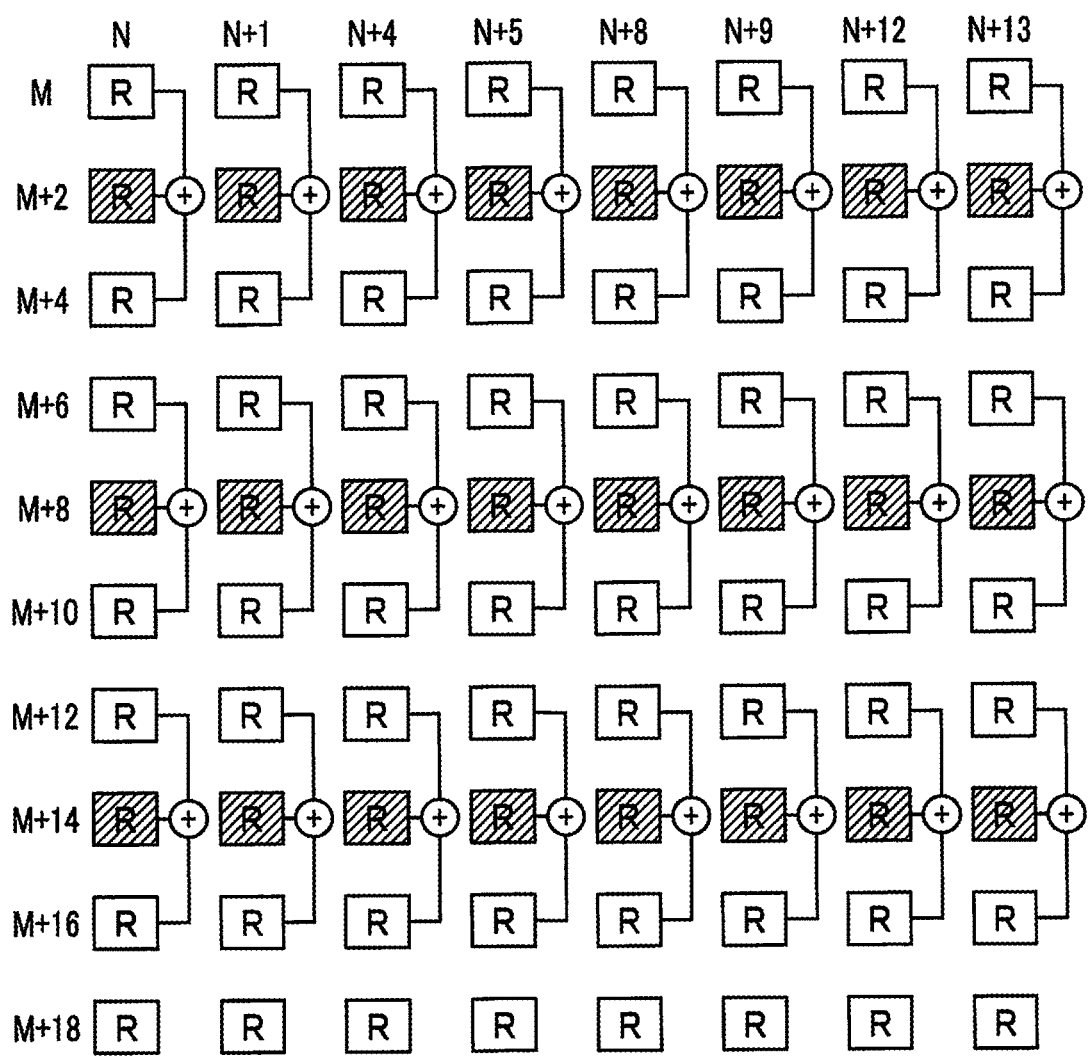
FIG. 11 is a diagram showing an example of vertical three-pixel mixing prioritizing image quality for the R divided pixels in the embodiment.
Figure 12:
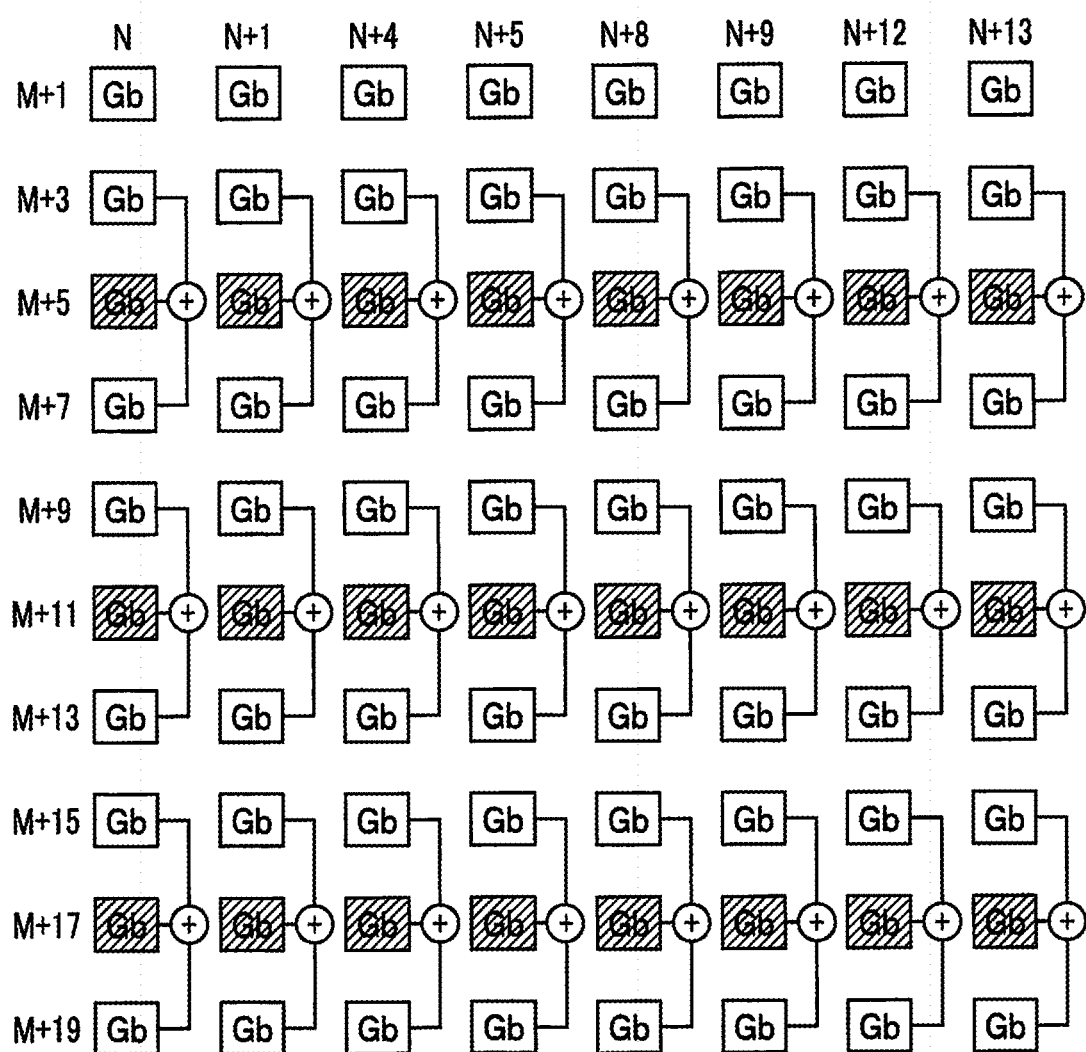
FIG. 12 is a diagram showing an example of the vertical three-pixel mixing prioritizing image quality for Gb divided pixels in the embodiment.
Figure 13:
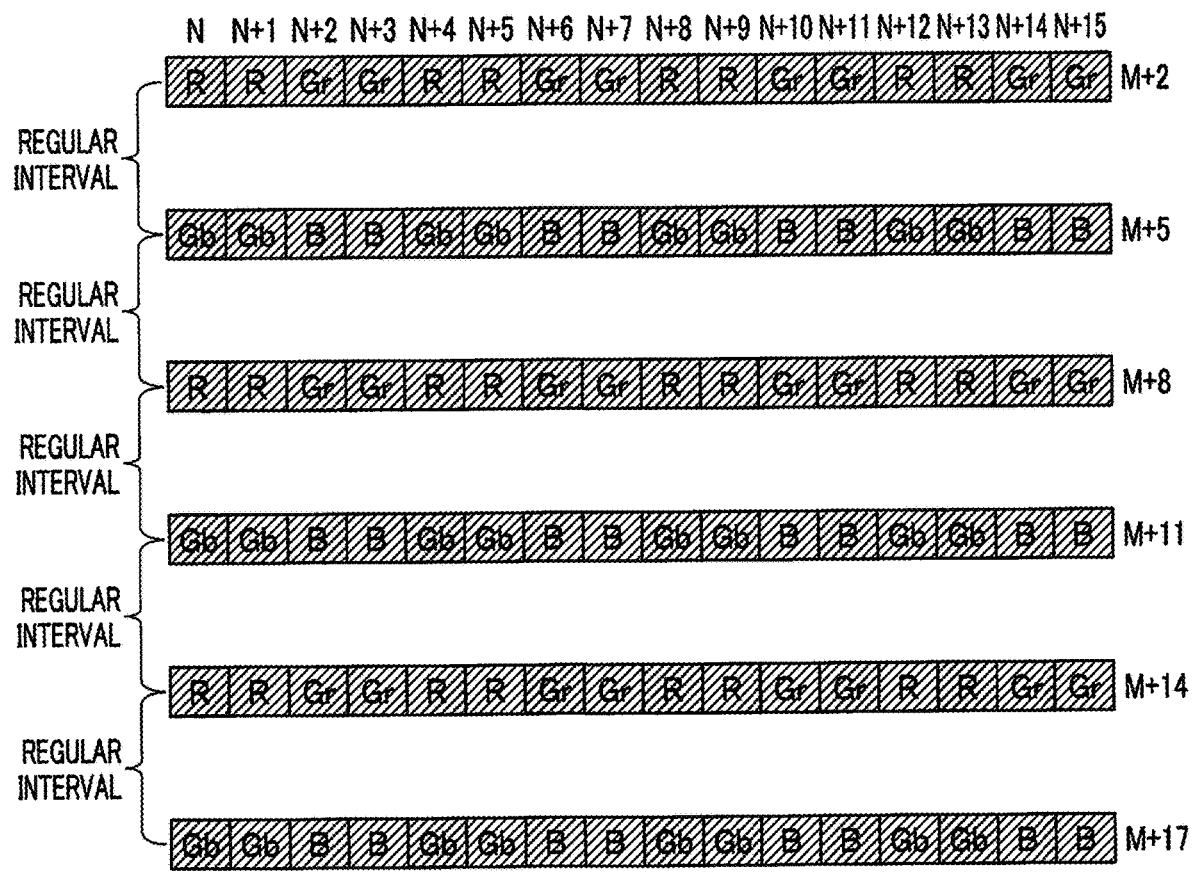
FIG. 13 is a diagram showing a state in which mixed pixels obtained by the vertical three-pixel mixing prioritizing image quality are arranged at regular intervals in the vertical direction in the embodiment.

In the case of, for such divided pixels divided in left and right directions as shown in FIG. 2, performing vertical three-pixel mixing for left divided pixels and for right divided pixels, separately, as shown in FIG. 11, FIG. 12 and the like, mixed pixels arranged at regular intervals in a vertical direction are obtained as shown in FIG. 13. Such mixed pixels are preferable from a viewpoint of improving image quality because the mixed pixels are arranged at regular intervals in the vertical and horizontal directions but cannot be said to be preferable from a viewpoint of phase difference detection.

In other words, if, in the case of using G (green) pixels which are mainly responsible for brightness components as phase difference pixels for AF, only Gr pixels on the same rows as R pixels (or only Gb pixels on the same rows as B pixels) are used, pixel intervals in the horizontal direction are increased. Therefore, in order to increase detection accuracy in the horizontal direction (vertical line detection accuracy), it is necessary to combine Gr and Gb pixels on adjoining rows. However, in an arrangement as shown in FIG. 13, since an interval in the vertical direction between a row on which Gr pixels are arrayed and a row on which Gb pixels are arrayed is wide, the phase difference detection accuracy is reduced.

The present embodiment has been made in view of the above situation, and an object is to provide an image pickup apparatus capable of reducing the number of pixels and improving the phase difference detection accuracy and an image pickup method.

Figure 1:
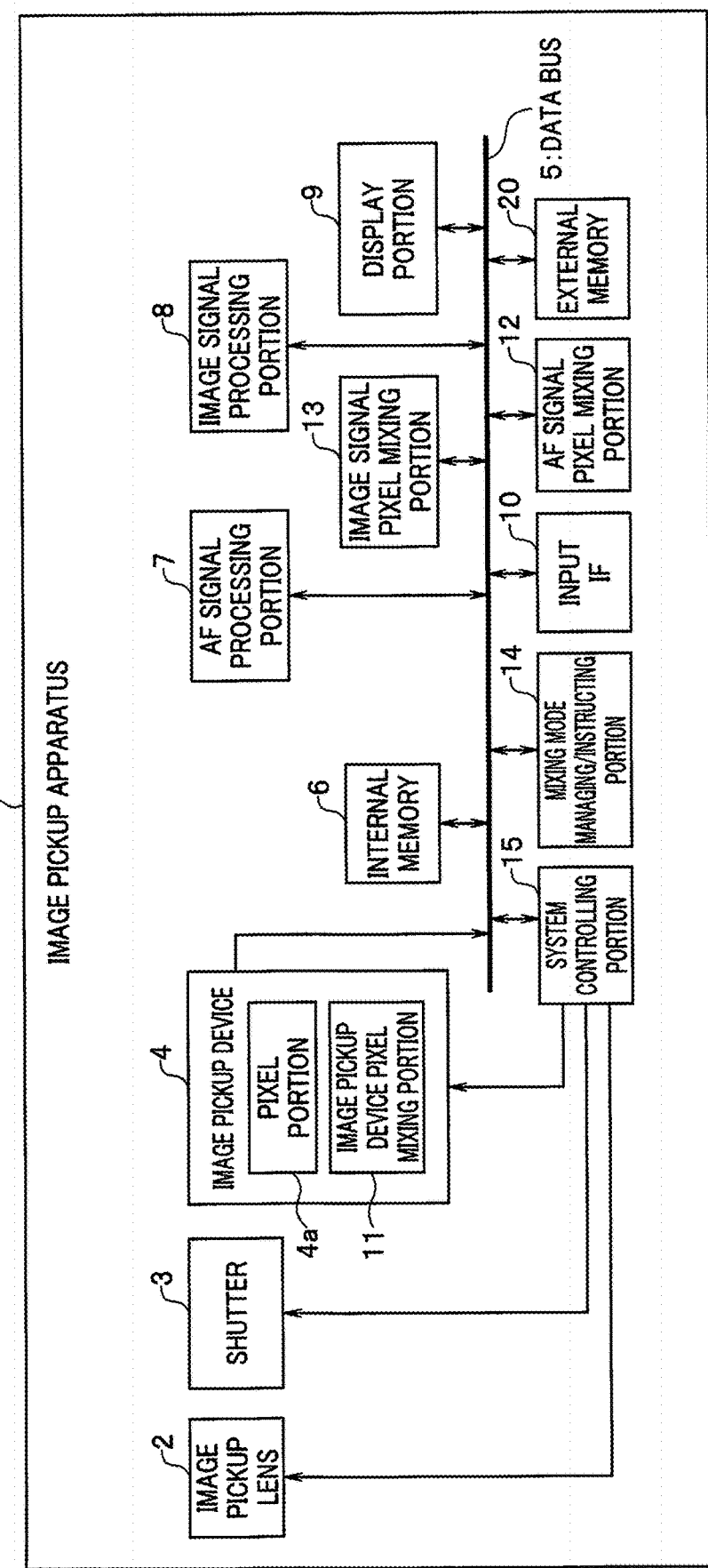
FIG. 1 is a block diagram showing a configuration of an image pickup apparatus in an embodiment of the present invention.

FIG. 1 is a block diagram showing a configuration of an image pickup apparatus 1.

The image pickup apparatus 1 is provided with an image pickup lens 2, a shutter 3, an image pickup device 4 having an image pickup device pixel mixing portion 11, a data bus 5, an internal memory 6, an AF signal processing portion 7, an image signal processing portion 8, a display portion 9, an input interface (IF) 10, an AF signal pixel mixing portion 12, an image signal pixel mixing portion 13, a mixing mode managing/instructing portion 14 and a system controlling portion 15. Note that though an external memory 20 is also shown in FIG. 1, the external memory 20 is not necessarily required to be in a configuration specific to the image pickup apparatus 1 because the external memory 20 is configured, for example, with a memory card or the like attachable to and detachable from the image pickup apparatus 1.

The image pickup lens 2 is an image pickup optical system configured to form an optical image of an object on the image pickup device 4. The image pickup lens 2 is provided with a focus lens for adjusting a focus position and an aperture for adjusting a light passage range. The image pickup lens 2 may be a zoom lens capable of adjusting a zoom position.

The shutter 3 adjusts an exposure time period of the image pickup device 4. Though it is assumed here that the shutter 3 is an optical shutter provided on an optical path through which an optical image of an object passes and configured to control arrival of the optical image to the image pickup device 4 and shading, for example, by performing an operation of opening/closing a shade, the shutter 3 is not limited to an optical shutter. A so-called electronic shutter may be used, or an optical shutter and an electronic shutter may be used together.

The image pickup device 4 is configured, for example, as a CMOS image sensor, a CCD image sensor or the like and configured to perform photoelectric conversion of an optical image of an object by a plurality of pixels arrayed in two dimensions (each pixel includes a photodiode (PD) for performing photoelectric conversion) to generate an image signal. Though it is assumed here that the image pickup device 4 is a digital image pickup device configured to output a digital image signal, the image pickup device 4 may be configured as an analog image pickup device, and an A/D converting portion may be separately provided between the image pickup device 4 and the data bus 5.

The image pickup device 4 is provided with a pixel portion 4a where a plurality of kinds of pixels with different spectral characteristics are arranged in a first direction and a second direction vertical to the first direction as repetition of a basic array, and an arbitrary pixel is divided into a plurality of divided pixels at a plurality of division positions in the first direction.

According to such a configuration, image data generated by the pixel portion 4a is configured with a plurality of pieces of pixel data arrayed in the first and second directions, and each piece of pixel data is configured with a plurality of pieces of divided pixel data in the first direction.

Here, FIG. 2 is a diagram showing a configuration of the divided pixels on the pixel portion 4a of the image pickup device 4. FIG. 2 illustrates pixel arrangement of vertical 20×horizontal 8 pixels (vertical 20×horizontal 16 divided pixels) on the pixel portion 4a and shows a part corresponding to row numbers M to (M+19) and column numbers N to (N+15) of divided pixels. Note that "row" may be called "line".

In the example shown in the present embodiment, the plurality of kinds of pixels with different spectral characteristics are R (red) pixels, G (green) pixels (Gr pixels which are G pixels on the same rows as the R pixels and Gb pixels which are G pixels on the same rows as B pixels) and the B (blue) pixels, and the basic array is a primary color Bayer array as shown in FIG. 2 (however, the plurality of kinds of pixels with different spectral characteristics are not limited to the above). One pixel corresponding to one microlens ML is divided into two divided pixels (a right divided pixel and a left divided pixel) in the horizontal direction which is the first direction.

According to such a configuration, it is possible to perform so-called vertical line detection by detecting a phase difference in the horizontal direction based on a group of right divided pixels arrayed in the horizontal direction and a group of left divided pixels arrayed in the horizontal direction.

Note that, though an example of divided pixels in the left and right directions has been shown here, it becomes possible to, by using divided pixels divided in up and down directions (upper divided pixels and lower divided pixels) with the first direction as the vertical direction, perform phase difference detection in the vertical direction, that is, so-called horizontal line detection.

Furthermore, if divided pixels obtained by dividing each one pixel corresponding to one microlens into four in the up, down, left and right directions are used, it becomes possible to perform both of the vertical line detection and the horizontal line detection.

Here, if, in the configuration of the pixel divided in four in the up, down, left and right directions, an upper left divided pixel and a lower left divided pixel are added, and an upper right divided pixel and a lower right divided pixel are added, then a configuration equal to a configuration of a pixel divided in two in the left and right directions as shown in FIG. 2 is obtained. Similarly, if, in the configuration of the pixel divided in four in the up, down, left and right directions, the upper left divided pixel and the upper right divided pixel are added, and the lower left divided pixel and the lower right divided pixel are added, then a configuration equal to a configuration of a pixel divided in two in the up and down directions is obtained.

The data bus 5 transmits various instructions, data and the like from a certain part to another part in the image pickup apparatus 1. In the example shown in FIG. 1, the data bus 5 is connected to the image pickup device 4, the internal memory 6, the AF signal processing portion 7, the image signal processing portion 8, the display portion 9, the input IF 10, the AF signal pixel mixing portion 12, the image signal pixel mixing portion 13, the mixing mode managing/instructing portion 14, the system controlling portion 15 and the external memory 20.

The internal memory 6 is configured being provided with a volatile DRAM, a nonvolatile flash memory and the like, nonvolatilely stores and holds a processing program configured to perform control of the whole image pickup apparatus 1, and temporarily or continuously stores and holds various kinds of data such as image data and user setting values. Image data outputted from the image pickup device 4 described above, image data outputted from the image pickup device 4 and mixed by the image signal pixel mixing portion 13, image data outputted from the image pickup device 4 and mixed by the AF signal pixel mixing portion 12 or image data processed by the image signal processing portion 8 is, for example, stored into the internal memory 6 once as necessary.

The AF signal processing portion 7 performs phase difference detection to calculate phase difference information, by processing such as differential operation based on divided pixel signals, and generates lens driving information based on the calculated phase difference information. The lens driving information generated by the AF signal processing portion 7 is inputted to the system controlling portion 15. The system controlling portion 15 is adapted to control a focus position of the image pickup lens 2 based on the inputted lens driving information to cause an object image formed on the image pickup device 4 to be focused.

The image signal processing portion 8 performs various kinds of processing such as white balance adjustment, demosaicking (color interpolation), color correction, γ conversion, edge emphasis, noise reduction, resolution conversion (resizing) and image compression, for image data.

The display portion 9 is a display device including a display panel, such as a TFT or organic electroluminescent panel, and configured to display image data as well as various kinds of information related to the image pickup apparatus 1.

The input IF 10 includes various kinds of operation input devices such as operation buttons, operation switches and a touch panel, and is an operation portion for a user to perform input to the image pickup apparatus 1 by operating the operation portion. The input IF 10 is provided with, for example, a first button (a so-called first release) and a second button (a so-called second release) constituting a two-stage button for shooting a still image, and a third button (a movie recording button) for shooting movie.

The image pickup device pixel mixing portion 11 is a pixel reducing portion configured to reduce the number of pixels by performing pixel reduction of divided pixel signals of a plurality of adjoining divided pixels related to pixels of the same kind and the same divided position to generate processed pixel signals, and is an in-device pixel reducing portion provided in the image pickup device 4. Though, in the present embodiment, an example of performing mixing as pixel reduction will be mainly described for any of the image pickup device pixel mixing portion 11, the AF signal pixel mixing portion 12 and the image signal pixel mixing portion 13, the pixel reduction is not limited to the above but may be performed by decimation (either mixing or decimation may be performed, or both may be performed). Note that, as the mixture, any of mixture by addition, mixture by averaging, mixture by weighted addition (or weighted averaging) and the like may be used.

More specifically, the image pickup device pixel mixing portion 11 is a pixel mixing portion configured to receive information about whether or not to perform mixing, from the mixing mode managing/instructing portion 14 and, if mixing is to be performed, further receive information about which mixing is to be performed, and perform mixing processing of pixel data in the image pickup device 4.

The mixing processing performed by the image pickup device pixel mixing portion 11 includes processing for adding divided pixel signals from a plurality of divided pixels included in one pixel (in the case of the divided pixel configuration in FIG. 2, left-right addition of adding left and right divided pixels of the same color to return the pixels to a normal pixel), vertical mixing of mixing divided pixel signals of a plurality of divided pixels related to the same color and the same division position adjoining in the vertical direction, horizontal mixing of mixing divided pixel signals of a plurality of divided pixels related to the same color and the same division position adjoining in the horizontal direction, and the like.

In a case where the image pickup device pixel mixing portion 11 does not perform the mixing processing or in a case where the image pickup device pixel mixing portion 11 performs at least either the vertical mixing or the horizontal mixing of divided pixel signals, the divided pixel signals are outputted from the image pickup device 4 as phase difference signals. In a case where the image pickup device pixel mixing portion 11 performs at least the left-right addition (including a case where at least either the vertical mixing or the horizontal mixing is combined with the left-right addition), image pixel signals that do not include phase difference information are outputted from the image pickup device 4.

Image data mix-processed by the image pickup device pixel mixing portion 11 may be handed over to each processing portion via the internal memory 6 but is, for example, handed over to the image signal pixel mixing portion 13 or the AF signal pixel mixing portion 12 not via the internal memory 6.

The AF signal pixel mixing portion 12 is a pixel reducing portion provided outside the image pickup device 4 and is a pixel mixing portion configured to, for image data outputted from the image pickup device 4 after being mix-processed by the image pickup device pixel mixing portion 11 as necessary, receive information about whether or not to perform mixing, from the mixing mode managing/instructing portion 14 and, if mixing is to be performed, further receive information about which mixing is to be performed and perform mixing processing of the image data.

Though the mixing processing performed by the AF signal pixel mixing portion 12 includes the vertical mixing and horizontal mixing described above, the left-right addition is not included because the mixing processing is for AF, and it is necessary that a left divided pixel and a right divided pixel are separated.

Then, the image data mix-processed by the AF signal pixel mixing portion 12 is handed over to the AF signal processing portion 7.

The image signal pixel mixing portion 13 is a pixel reducing portion configured to reduce the number of pixels but is only required to generate an image signal and does not require phase difference information. Therefore, the image signal pixel mixing portion 13 is not required to perform pixel reduction in a manner of leaving divided pixel signals, and it is sufficient to output pixel signals obtained by left-right addition.

More specifically, the image signal pixel mixing portion 13 is a pixel mixing portion configured to, for image data outputted from the image pickup device 4 after being mix-processed by the image pickup device pixel mixing portion 11 as necessary, receive information about whether or not to perform mixing, from the mixing mode managing/instructing portion 14 and, if mixing is to be performed, further receive information about which mixing is to be performed and perform mixing processing of the image data.

The image signal pixel mixing portion 13 performs mixing processing suitable for a display image or movie. The mixing processing performed by the image signal pixel mixing portion 13 includes the vertical mixing, horizontal mixing and left-right addition described above.

Then, the image data mix-processed by the image signal pixel mixing portion 13 is handed over to the image signal processing portion 8.

The mixing mode managing/instructing portion 14 is a controlling portion configured to control pixel reduction by the pixel reducing portions according to whether or not to prioritize phase difference detection.

In the case of prioritizing phase difference detection, the mixing mode managing/instructing portion 14 controls the pixel mixing portions so that processed pixel signals (mixed pixel signals) are not arranged at regular intervals in a direction vertical to a division direction (the second direction).

On the other hand, in the case of not prioritizing phase difference detection (for example, in the case of prioritizing image quality to phase difference detection) and causing pixel reduction of divided pixel signals of a plurality of divided pixels adjoining in the second direction to be performed, the mixing mode managing/instructing portion 14 controls the pixel mixing portions so that processed pixel signals are arranged at regular intervals in the second direction.

In the case of causing pixel reduction of divided pixel signals of a plurality of divided pixels adjoining in the first direction to be performed irrespective of whether or not to prioritize phase difference detection, the mixing mode managing/instructing portion 14 controls the pixel mixing portions so that processed pixel signals are arranged at regular intervals in the first direction.

More specifically, the mixing mode managing/instructing portion 14 is a mixing controlling portion configured to manage which mixing method (for example, among various kinds of mixing methods that are different in the number of pixels to be mixed (the number of divided pixels), whether or not to perform weighting at the time of mixing, and the like) is optimal for image signal processing and which is optimal for AF signal processing and control mixing by the image mixing portions (the image pickup device pixel mixing portion 11, the AF signal pixel mixing portion 12 and the image signal pixel mixing portion 13) according to whether to prioritize phase difference detection or to prioritize image quality. The decision of a mixing method by the mixing mode managing/instructing portion 14 is performed, for example, based on an instruction by the input IF 10 (a button or the like), or exposure conditions decided for a previous frame, object information or the like (however, the decision may be performed based on other factors).

The external memory 20 is configured, for example, with a memory card attachable to and detachable from the image pickup apparatus 1 as described above and is a nonvolatile recording medium configured to store an image processed by the image signal processing portion 8 for recording, for example, in a format of an image file.

The system controlling portion 15 is provided with a processor configured with hardware such as a CPU and configured to comprehensively control the whole image pickup apparatus 1 according to the processing program nonvolatilely recorded in the internal memory 6.

For example, the system controlling portion 15 performs driving control of the image pickup lens 2 to cause a focus position, a zoom state, an aperture opening diameter and the like to be changed. Further, the system controlling portion 15 performs driving control of the shutter 3 to cause opening/closing of the shade to be performed. Furthermore, the system controlling portion 15 controls operation of the image pickup device 4 from accumulation of pixel signals to output of image data.

Thus, the image pickup apparatus of the present embodiment is configured to be capable of performing mixing processing prioritizing phase difference detection (see FIGS. 3 to 10, and the like) and mixing processing prioritizing image quality (see FIGS. 11 to 15, and the like).

In description of FIGS. 3 to 15 below, mixing processing of pixels of different colors and mixture of divided pixels at different division positions (left-right addition and the like) are excluded, and mixing processing of divided pixels with spectral characteristics of the same kind (for example, the same color) and at the same division position (left division, right division or the like) will be considered.

Figure 4:
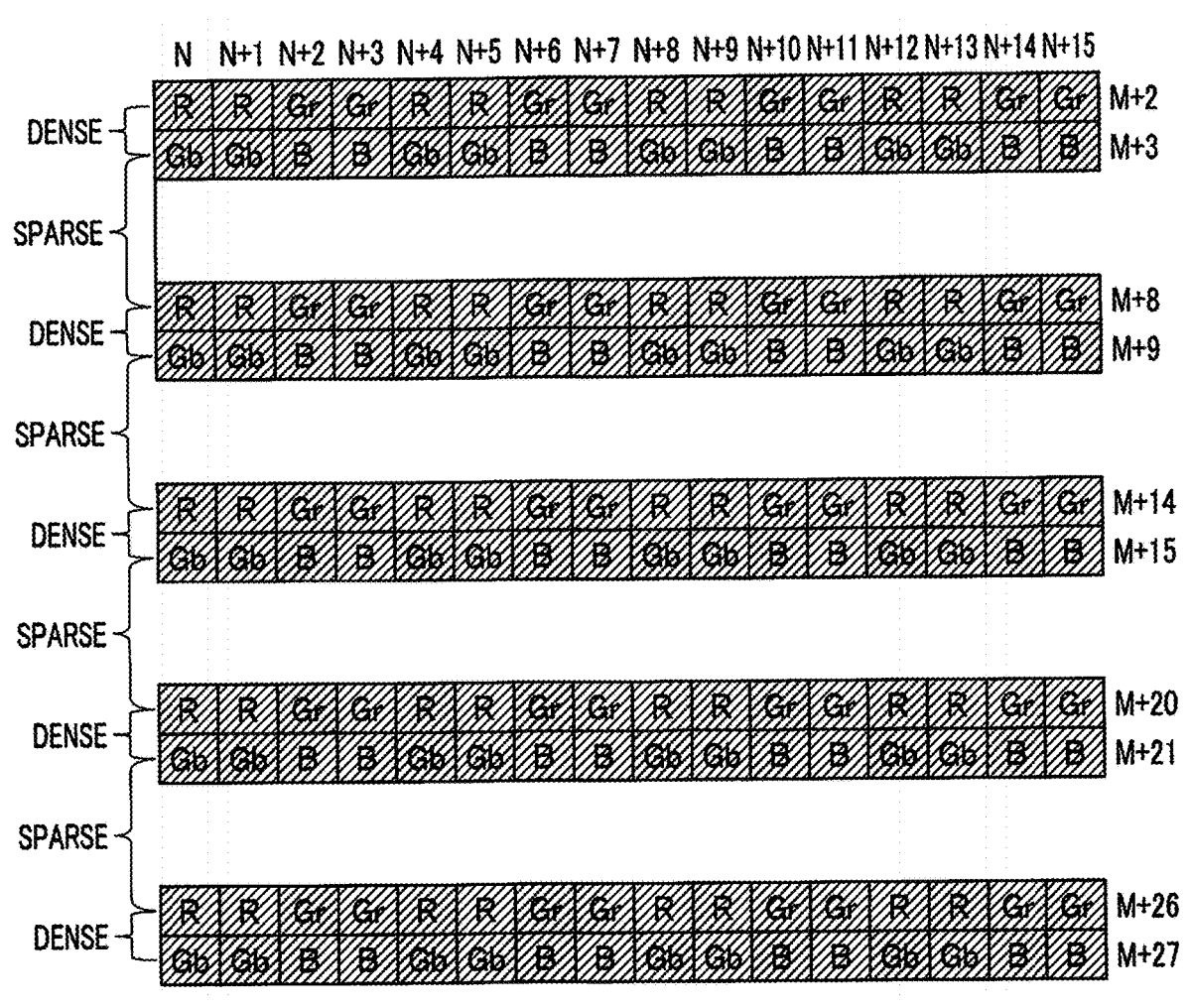
Figure 8:
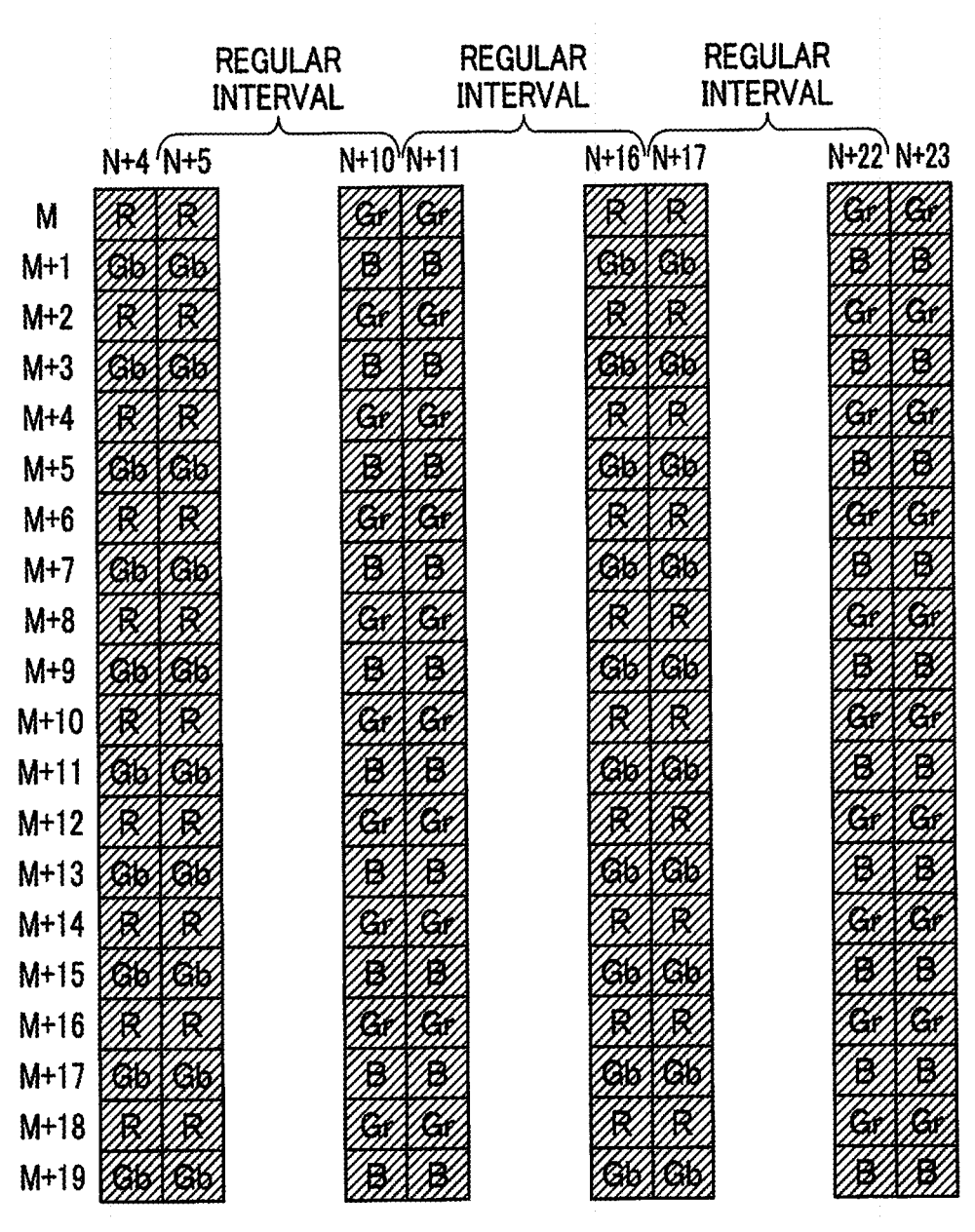

For example, in mixing processing prioritizing phase difference detection in the horizontal direction (vertical line detection), left divided pixels and right divided pixels are separately mixed, and, moreover, it is required to satisfy conditions that paired left and right divided pixels should be in a positional relationship of being displaced from each other by a half pixel pitch (one divided pixel pitch) in the horizontal direction even after being mixed, that a Gr divided pixel and a Gb divided pixel used in combination in phase difference detection should be at positions close to each other in the vertical direction after being mixed, and the like (see FIGS. 4 and 8, and the like).

First, some examples of the mixing processing prioritizing phase difference detection will be described with reference to FIGS. 3 to 10.

A first example of the mixing processing prioritizing phase difference detection (vertical three-pixel mixing) will be described with reference to FIGS. 3 and 4. Note that vertical mixing of an odd number of pixels equal to or larger than three is also performed according to a method described here.

Figure 3:
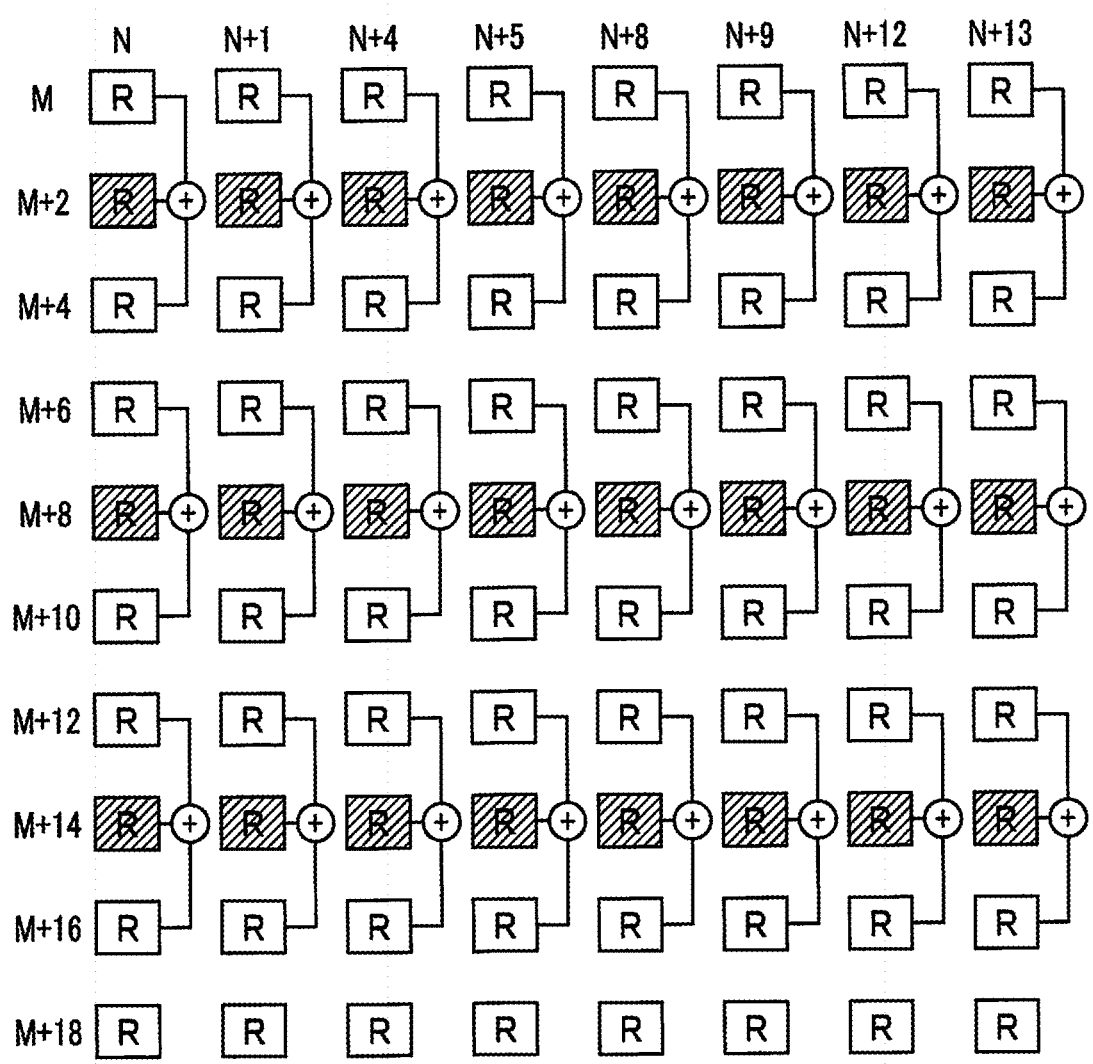
FIG. 3 is a diagram showing an example of vertical three-pixel mixing prioritizing phase difference detection for R divided pixels in the embodiment.

FIG. 3 is a diagram showing an example of vertical three-pixel mixing prioritizing phase difference detection for R divided pixels. Row numbers and column numbers shown in FIG. 3 correspond to row numbers and column numbers shown in FIG. 2.

In the example shown in FIG. 2, when i and j are integers, R divided pixels obtained by dividing an R pixel in the left and right directions are arranged at positions with (row number, column number) of ((M+2i), (N+4j)) and (row number, column number) of ((M+2i), (N+4j+1)), respectively.

In the example shown in FIG. 3, three R divided pixels adjoining in the vertical direction with the same column number and with row numbers (M+6i), (M+6i+2) and (M+6i+4) are added (or may be averaged; the same applies hereinafter). The mixed pixels that have been added are arranged at a position of a central R divided pixel, that is, a position with the row number (M+6i+2) from gravity center positions of the three R divided pixels in the vertical direction.

Therefore, in a case where the pixel mixing portions (the image pickup device pixel mixing portion 11, the AF signal pixel mixing portion 12 and the image signal pixel mixing portion 13), which are pixel reducing portions, perform pixel reduction by mixing, the mixing mode managing/instructing portion 14, which is a controlling portion, sets a gravity center position of processed pixel signals (mixed pixels) by specifying positions of a plurality of divided pixels targeted to be mixed (here, row numbers indicating positions in the vertical direction).

Note that, in a case where the pixel reducing portions perform pixel reduction by decimation, the mixing mode managing/instructing portion 14 can set a position of processed pixel signals by specifying positions of divided pixels that are left without being targeted to be decimated.

The vertical three-pixel mixing for Gr divided pixels, for Gb divided pixels and for B divided pixels is performed as described below though the vertical three-pixel mixing is not shown in a figure.

First, Gr divided pixels obtained by dividing a Gr pixel in the left and right directions are arranged at positions indicated by (row number, column number) of ((M+2i), (N+4j+2)) and ((M+2i), (N+4j+3)), respectively.

Then, similarly to the case of the R divided pixels, three Gr divided pixels adjoining in the vertical direction with row numbers (M+6i), (M+6i+2) and (M+6i+4) are added. The mixed pixels that have been added are arranged at a position of a central Gr divided pixel, that is, a position with the row number (M+6i+2) similarly to the case of the R divided pixels.

Next, Gb divided pixels obtained by dividing a Gb pixel in the left and right directions are arranged at positions indicated by (row number, column number) of ((M+2i+1), (N+4j)) and ((M+2i+1), (N+4j+1)), respectively.

Then, three Gb divided pixels adjoining in the vertical direction with row numbers (M+6i+1), (M+6i+3) and (M+6i+5) are added. The mixed pixels that have been added are arranged at a position of a central Gb divided pixel, that is, a position with the row number (M+6i+3).

Furthermore, B divided pixels obtained by dividing a B pixel in the left and right directions are arranged at positions indicated by (row number, column number) of ((M+2i+1), (N+4j+2)) and ((M+2i+1), (N+4j+3)), respectively.

Then, similarly to the case of the Gb divided pixels, three B divided pixels adjoining in the vertical direction with row numbers (M+6i+1), (M+6i+3) and (M+6i+5) are added. The mixed pixels that have been added are arranged at a position of a central B divided pixel, that is, a position with the row number (M+6i+3) similarly to the case of the Gb divided pixels.

FIG. 4 is a diagram showing a state in which mixed pixels obtained by the vertical three-pixel mixing prioritizing phase difference detection are not arranged at regular intervals in the vertical direction.

It is the G pixels that are mainly responsible for brightness components. As a result of performing the vertical three-pixel mixing prioritizing phase difference detection as described above, the Gr mixed pixel arranged at the row number (M+6i+2) and the Gb mixed pixel arranged at the row number (M+6i+3) are mutually close (dense) in the vertical direction because the row numbers are different only by one. On the other hand, the Gb mixed pixel arranged at the row number (M+6i+3) and the Gr mixed pixel arranged at the row number (M+6i+8) are mutually distant (sparse) in the vertical direction because the row numbers are different by five.

More specifically, as shown in FIG. 4, the mixed pixels are alternately closely and distantly arranged, and rows of row numbers (M+2) and (M+3), rows of row numbers (M+8) and (M+9), . . . are mutually close, and rows of row numbers (M+3) and (M+8), rows of row numbers (M+9) and (M+14), . . . are mutually distant.

Since Gb divided pixels and Gr divided pixels are arranged at consecutive numbers N, (N+1), (N+2), (N+3), (N+4), . . . on closely arranged two rows, arrangement density is twice arrangement density in the case of only Gb divided pixels on one row (or twice arrangement density in the case of only Gr divided pixels on one row). Therefore, in comparison with a case of performing phase difference detection in the horizontal direction (that is, vertical line detection) using only G components of one row, double detection accuracy can be basically obtained. At this time, displacement between the Gb divided pixels and the Gr divided pixels in the vertical direction corresponds to one row, and, therefore, it is possible to suppress a possibility of misdetection based on a different vertical line to be extremely small. Thus, by using the mixed pixels arranged as shown in FIG. 4, it is possible to obtain detection accuracy equal to detection accuracy in the case of reading out all the divided pixels shown in FIG. 2 and performing phase difference detection using the Gb divided pixels and the Gr divided pixels.

A second example of the mixing processing prioritizing phase difference detection (vertical two-pixel mixing) will be described with reference to FIG. 5. Note that vertical mixing of an even number of pixels equal to or larger than two is also performed according to a method described here.

Figure 5:
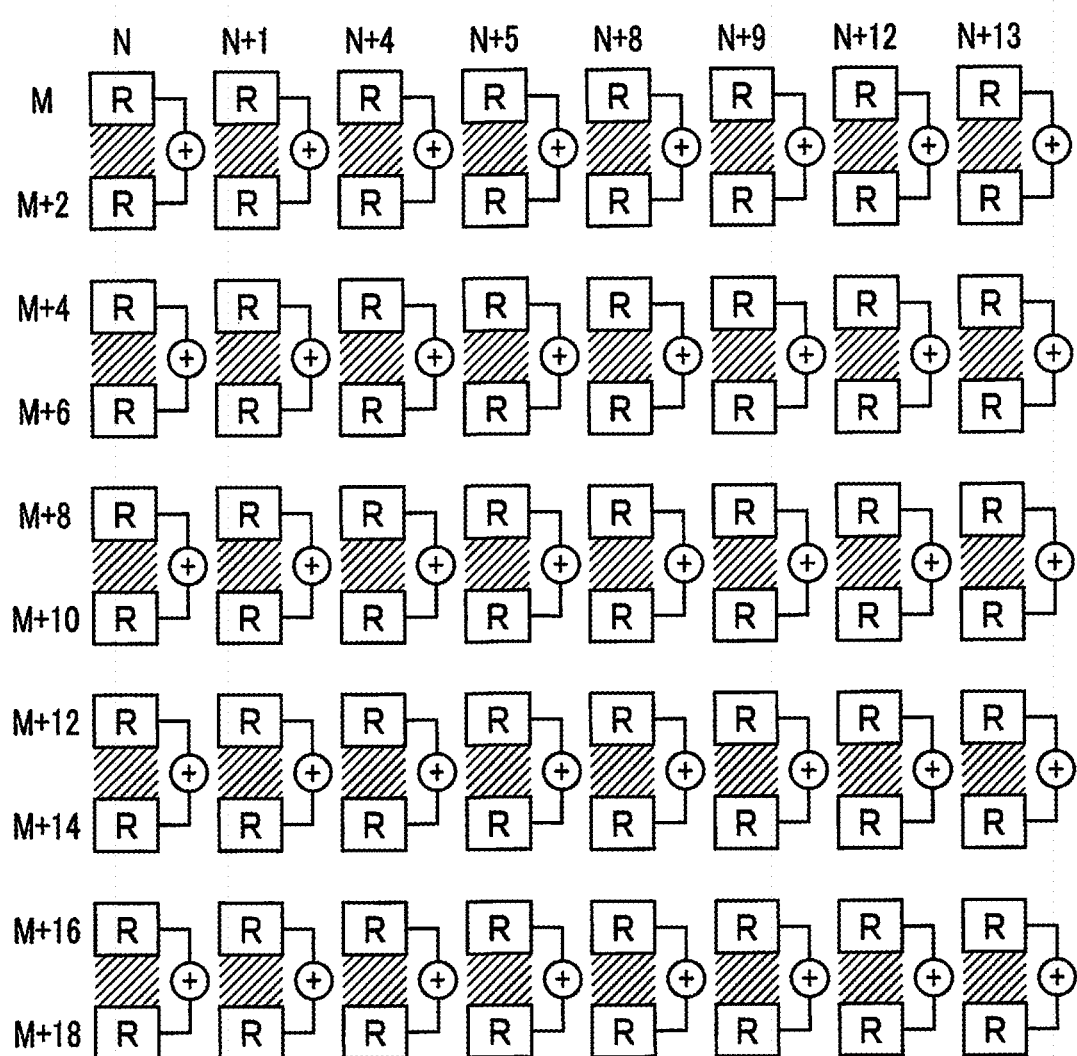
FIG. 5 is a diagram showing an example of vertical two-pixel mixing prioritizing phase difference detection for the R divided pixels in the embodiment.

FIG. 5 is a diagram showing an example of the vertical two-pixel mixing prioritizing phase difference detection for the R divided pixels.

In the case of the vertical two-pixel mixing, two R divided pixels adjoining in the vertical direction with the same column number and with row numbers (M+4i) and (M+4i+2) are added as shown in FIG. 5. The mixed pixels that have been added are arranged at an intermediate position indicated by hatching, that is, a position with the row number (M+4i+1) from gravity center positions of the two R divided pixels in the vertical direction.

The vertical two-pixel mixing for the Gr divided pixels, for the Gb divided pixels and for the B divided pixels is performed as described below though the vertical three-pixel mixing is not shown in a figure.

First, as for the Gr divided pixels, two Gr divided pixels adjoining in the vertical direction with row numbers (M+4i) and (M+4i+2) are added similarly to the case of the R divided pixels. The mixed pixels that have been added are arranged at an intermediate position, that is, a position with the row number (M+4i+1) similarly to the case of the R divided pixels.

Next, as for the Gb divided pixels, two Gb divided pixels adjoining in the vertical direction with row numbers (M+4i+1) and (M+4i+3) are added. The mixed pixels that have been added are arranged at an intermediate position, that is, a position with the row number (M+4i+2).

Furthermore, as for the B divided pixels, two B divided pixels adjoining in the vertical direction with row numbers (M+4i+1) and (M+4i+3) are added similarly to the case of the Gb divided pixels. The mixed pixels that have been added are arranged at an intermediate position, that is, a position with the row number (M+4i+2) similarly to the case of the Gb divided pixels.

As a result of performing the vertical two-pixel mixing prioritizing phase difference detection as described above, the Gr mixed pixel arranged at the row number (M+4i+1) and the Gb mixed pixel arranged at the row number (M+4i+2) are mutually close in the vertical direction because the row numbers are different only by one. On the other hand, the Gb mixed pixel arranged at the row number (M+4i+2) and the Gr mixed pixel arranged at the row number (M+4i+5) are mutually distant in the vertical direction because the row numbers are different by three.

More specifically, the mixed pixels are alternately closely and distantly arranged, and rows of row numbers (M+1) and (M+2), rows of row numbers (M+5) and (M+6), . . . are mutually close, and rows of row numbers (M+2) and (M+5), rows of row numbers (M+6) and (M+9), . . . are mutually distant.

By using Gb divided pixels and Gr divided pixels in closely arranged two rows, it becomes possible to obtain detection accuracy equal to detection accuracy of reading out all pixels, similarly to the above description.

A third example of the mixing processing prioritizing phase difference detection (horizontal three-pixel mixing) will be described with reference to FIGS. 6 to 8. Note that horizontal mixing of an odd number of pixels equal to or larger than three is also performed according to a method described here.

Figure 6:
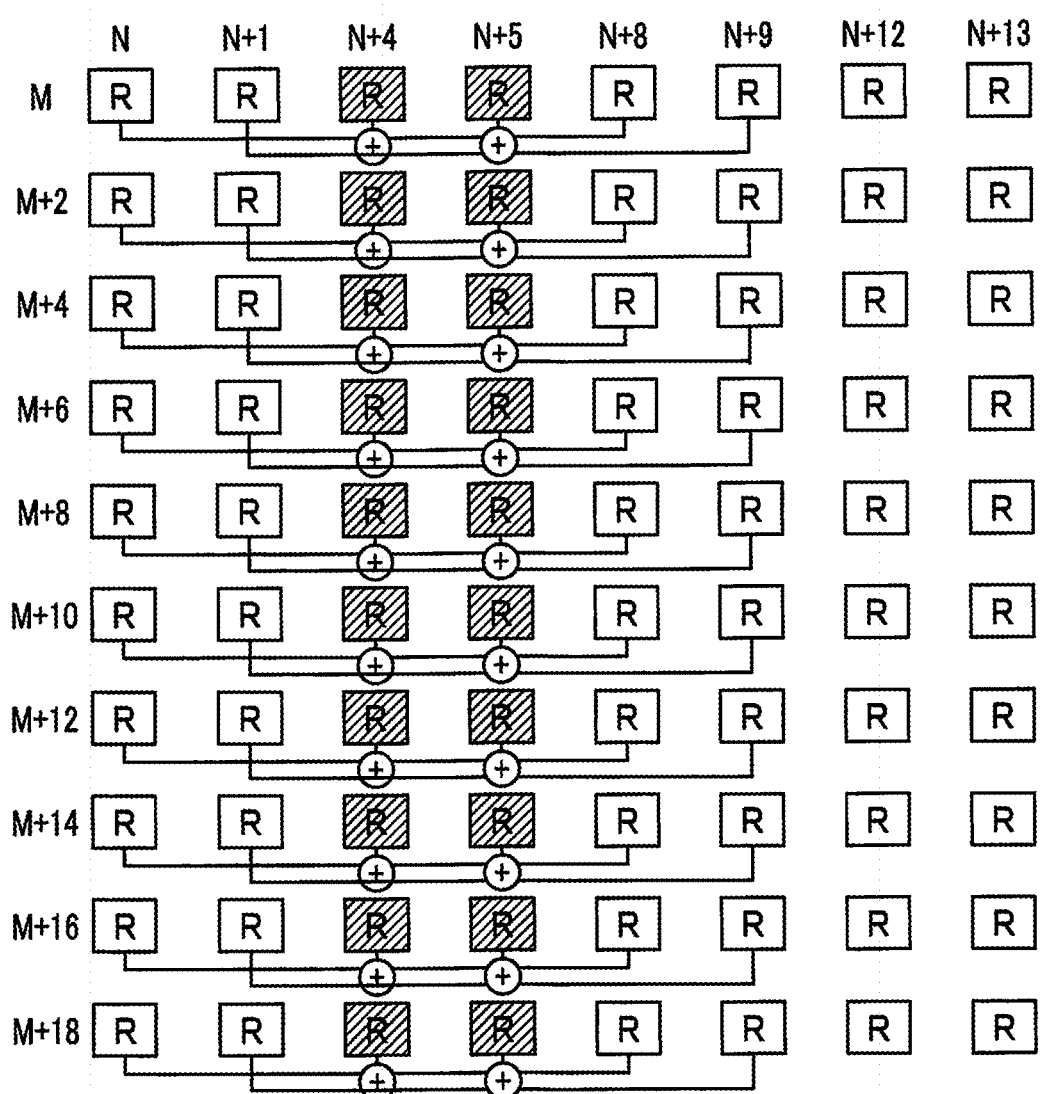
FIG. 6 is a diagram showing an example of horizontal three-pixel mixing prioritizing phase difference detection for the R divided pixels in the embodiment.

FIG. 6 is a diagram showing an example of the horizontal three-pixel mixing prioritizing phase difference detection for the R divided pixels.

In the example shown in FIG. 6, three R left divided pixels adjoining in the horizontal direction with the same row number and with column numbers (N+12i), (N+12i+4) and (N+12i+8) are added, and three R right divided pixels adjoining in the horizontal direction with column numbers (N+12i+1), (N+12i+5) and (N+12i+9) are added. The mixed pixels that have been added are arranged at a position of a central R divided pixel, that is, a position with the column number (N+12i+4) for the R left divided pixels, and a position with the column number (N+12i+5) for the R right divided pixels, respectively, from gravity center positions of three R divided pixels in the horizontal direction.

Figure 7:
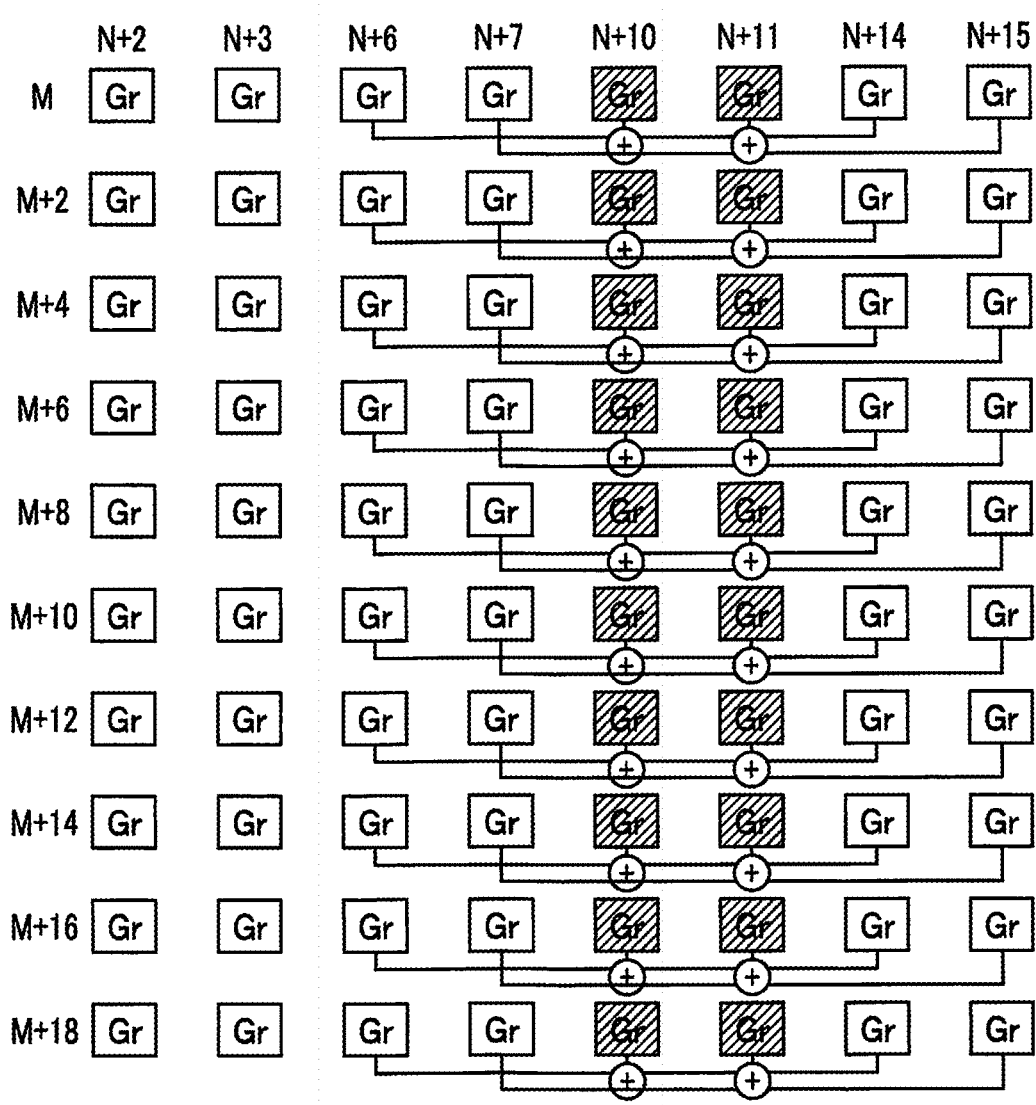
FIG. 7 is a diagram showing an example of the horizontal three-pixel mixing prioritizing phase difference detection for Gr divided pixels in the embodiment.

FIG. 7 is a diagram showing an example of the horizontal three-pixel mixing prioritizing phase difference detection for the Gr divided pixels.

In the example shown in FIG. 7, three Gr left divided pixels adjoining in the horizontal direction with the same row number and with column numbers (N+12i+6), (N+12i+10) and (N+12i+14) are added, and three Gr right divided pixels adjoining in the horizontal direction with column numbers (N+12i+7), (N+12i+11) and (N+12i+15) are added. The mixed pixels that have been added are arranged at a position of a central Gr divided pixel, that is, a position with the column number (N+12i+10) for the Gr left divided pixels, and a position with the column number (N+12i+11) for the Gr right divided pixels, respectively, from gravity center positions of the three Gr divided pixels in the horizontal direction.

The horizontal three-pixel mixing for the Gb divided pixels and for the B divided pixels is performed as described below though the horizontal three-pixel mixing is not shown in a figure.

First, as for the Gb divided pixels, three Gb left divided pixels adjoining in the horizontal direction with column numbers (N+12i), (N+12i+4) and (N+12i+8) are added, and three Gb right divided pixels adjoining in the horizontal direction with column numbers (N+12i+1), (N+12i+5) and (N+12i+9) are added. The mixed pixels that have been added are arranged at a position of a central Gb divided pixel, that is, a position with the column number (N+12i+4) for the Gb left divided pixels, and a position with the column number (N+12i+5) for the Gb right divided pixels, respectively, from gravity center positions of the three Gb divided pixels in the horizontal direction.

Next, as for the B divided pixels, three B left divided pixels adjoining in the horizontal direction with column numbers (N+12i+6), (N+12i+10) and (N+12i+14) are added, and three B right divided pixels adjoining in the horizontal direction with column numbers (N+12i+7), (N+12i+11) and (N+12i+15) are added. The mixed pixels that have been added are arranged at a position of a central B divided pixel, that is, a position with the column number (N+12i+10) for the B left divided pixels, and a position with the column number (N+12i+11) for the B right divided pixels, respectively, from gravity center positions of the three B divided pixels in the horizontal direction.

FIG. 8 is a diagram showing an example in which mixed pixels obtained by the horizontal three-pixel mixing prioritizing phase difference detection are arranged at regular intervals in the horizontal direction.

Because left divided pixels and right divided pixels are separately mixed, and mixed pixels are arranged at regular intervals in the horizontal direction (when mixed pixels related to the left divided pixels, the mixed pixels are arranged at regular intervals; and, similarly, when mixed pixels related to the right divided pixels, the mixed pixels are arranged at regular intervals) as described above (and because paired left and right divided pixels are in a positional relationship of being displaced from each other by a half pixel pitch (one divided pixel pitch) in the horizontal direction even after being mixed as described above), it is possible to perform phase difference detection. However, in comparison with the arrangement of mixed pixels as shown in FIG. 4, pixel intervals in the horizontal direction are long; and, even if the Gb divided pixels and the Gr divided pixels in two consecutive rows are used for phase difference detection, arrangement density in the horizontal direction is ⅓ of density of the arrangement of FIG. 4. Therefore, in the case of the horizontal three-pixel mixing as shown in FIG. 8, phase difference detection accuracy corresponding to approximately ⅓ of phase difference detection accuracy in the case of reading out all pixels or the vertical three-pixel mixing shown in FIG. 4 can be obtained (however, since phase difference detection accuracy is not determined only by pixel arrangement density, the numerical value of ⅓ is merely a value from a viewpoint of pixel arrangement density in the horizontal direction).

A fourth example of the mixing processing prioritizing phase difference detection (horizontal two-pixel mixing) will be described with reference to FIGS. 9 and 10. Note that horizontal mixing of an even number of pixels equal to or larger than two is also performed according to a method described here.

Figure 9:
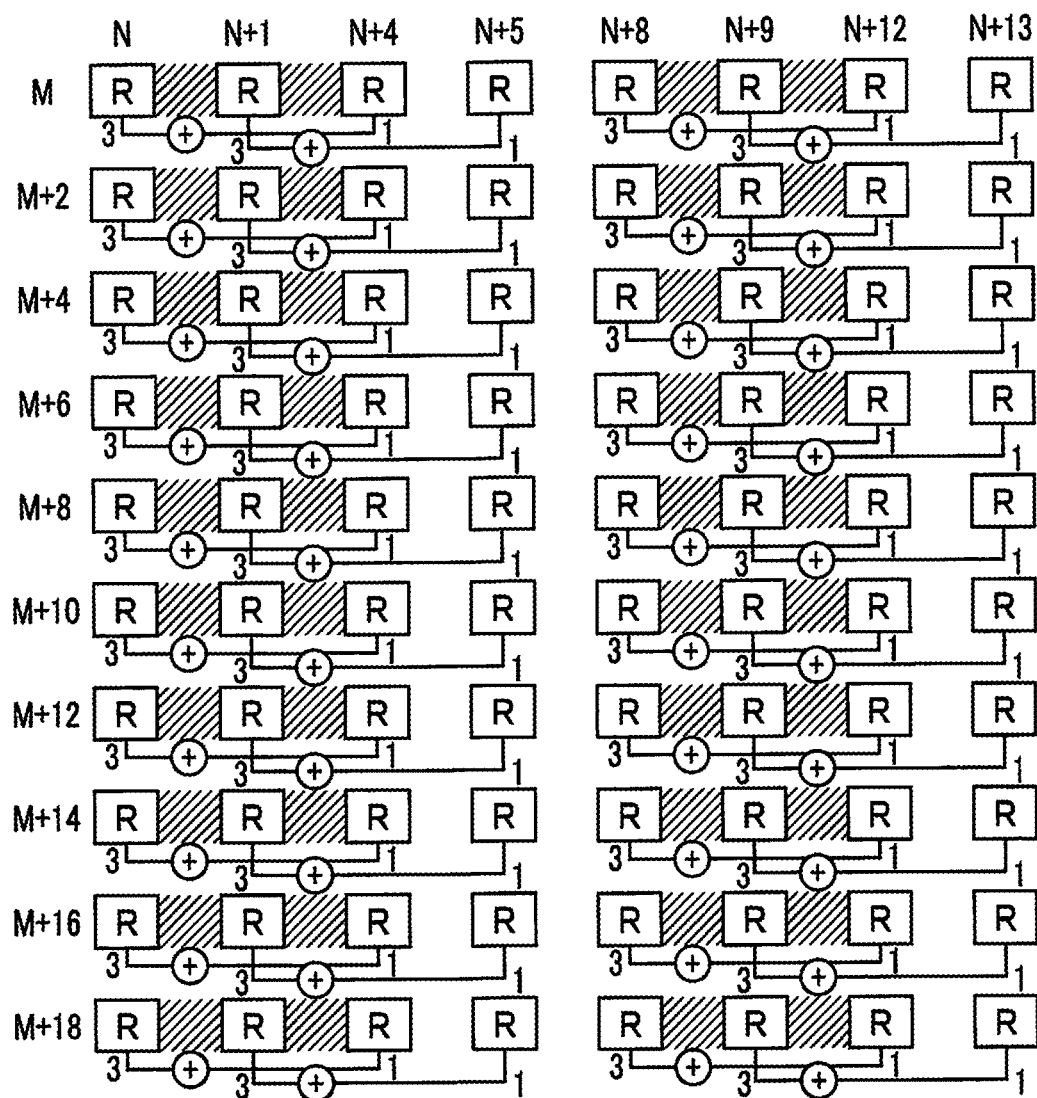
FIG. 9 is a diagram showing an example of performing horizontal two-pixel mixing prioritizing phase difference detection for the R divided pixels by weighted addition in the embodiment.

FIG. 9 is a diagram showing an example of performing the horizontal two-pixel mixing prioritizing phase difference detection for the R divided pixels by weighted addition.

In the example shown in FIG. 9, two R left divided pixels adjoining in the horizontal direction with the same row number and with column numbers (N+8i) and (N+8i+4) are weightedly added at 3:1, and two R right divided pixels adjoining in the horizontal direction with column numbers (N+8i+1) and (N+8i+5) are weightedly added at 3:1.

Here, a weight is specified from the mixing mode managing/instructing portion 14 to the pixel mixing portions (the image pickup device pixel mixing portion 11, the AF signal pixel mixing portion 12 and the image signal pixel mixing portion 13) which are pixel reducing portions.

For the R left divided pixels, the weightedly added mixed pixels are arranged at a position with the column number (N+8i+1). For the R right divided pixels, the weightedly added mixed pixels are arranged at a position with the column number (N+8i+2).

Thus, the mixing mode managing/instructing portion 14, which is a controlling portion, sets gravity center positions of processed pixel signals (the mixed pixels) by further specifying a mixture ratio of divided pixel signals of a plurality of divided pixels targeted to be mixed.

Figure 10:
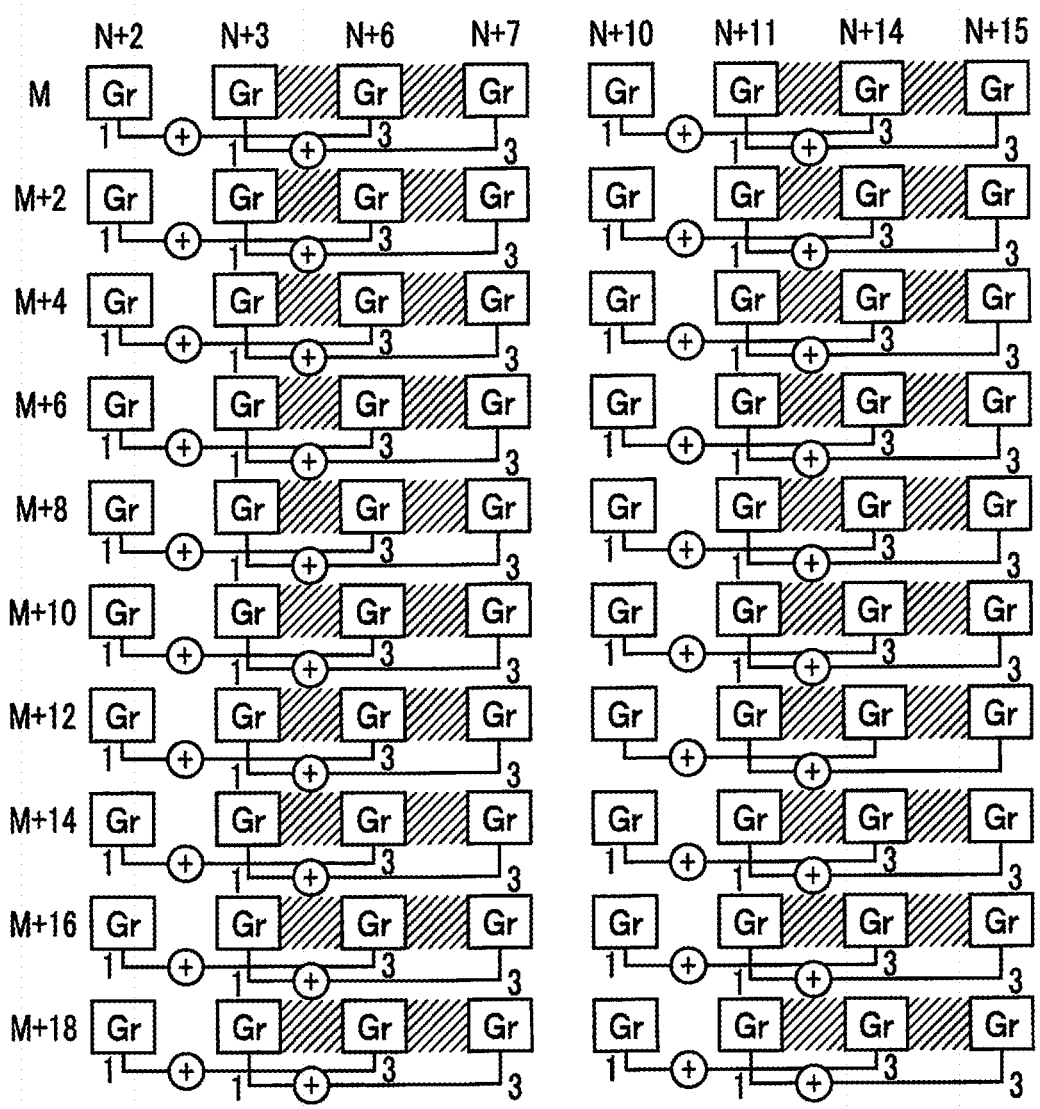
FIG. 10 is a diagram showing an example of performing the horizontal two-pixel mixing prioritizing phase difference detection for the Gr divided pixels by weighted addition in the embodiment.

FIG. 10 is a diagram showing an example of performing the horizontal two-pixel mixing prioritizing phase difference detection for the Gr divided pixels by weighted addition.

In the example shown in FIG. 10, two Gr left divided pixels adjoining in the horizontal direction with the same row number and with column numbers (N+8i+2) and (N+8i+6) are weightedly added at 1:3, and two Gr right divided pixels adjoining in the horizontal direction with column numbers (N+8i+3) and (N+8i+7) are weightedly added at 1:3. For the Gr left divided pixels, the weightedly added mixed pixels are arranged at a position with the column number (N+8i+5). For the Gr right divided pixels, the weightedly added mixed pixels are arranged at a position with the column number (N+8i+6).

The horizontal two-pixel mixing for the Gb divided pixels and for the B divided pixels is performed as described below though the horizontal two-pixel mixing is not shown in a figure.

First, for the Gb divided pixels, two Gb left divided pixels adjoining in the horizontal direction with column numbers (N+8i) and (N+8i+4) are weightedly added at 3:1, and two Gb right divided pixels adjoining in the horizontal direction with column numbers (N+8i+1) and (N+8i+5) are weightedly added at 3:1. For the Gb left divided pixels, the weightedly added mixed pixels are arranged at a position with the column number (N+8i+1). For the Gb right divided pixels, the weightedly added mixed pixels are arranged at a position with the column number (N+8i+2).

Next, for the B divided pixels, two B left divided pixels adjoining in the horizontal direction with column numbers (N+8i+2) and (N+8i+6) are weightedly added at 1:3, and two B right divided pixels adjoining in the horizontal direction with column numbers (N+8i+3) and (N+8i+7) are weightedly added at 1:3. For the B left divided pixels, the weightedly added mixed pixels are arranged at a position with the column number (N+8i+5). For the B right divided pixels, the weightedly added mixed pixels are arranged at a position with the column number (N+8i+6).

By performing such processing, paired left and right divided pixels are in a positional relationship of being displaced from each other by a half pixel pitch (one divided pixel pitch) in the horizontal direction even after being mixed, and pairs of left and right divided pixels are arranged at regular intervals in the horizontal direction.

Next, some examples of the mixing processing prioritizing image quality will be described with reference to FIGS. 11 to 15.

The mixing processing prioritizing image quality is required to satisfy conditions, for example, that pairs of left and right divided pixels used for phase difference detection are arranged at regular intervals in both of the vertical and horizontal directions.

First, a first example of the mixing processing prioritizing image quality (vertical three-pixel mixing) will be described with reference to FIGS. 11 to 13. Note that vertical mixing of an odd number of pixels equal to or larger than three is also performed according to a method described here.

FIG. 11 is a diagram showing an example of the vertical three-pixel mixing prioritizing image quality for the R divided pixels. As shown in FIG. 11, the vertical three-pixel mixing for the R divided pixels is similar to the vertical three-pixel mixing prioritizing phase difference detection (FIG. 3). Further, the vertical three-pixel mixing for the Gr divided pixels is also similar to the vertical three-pixel mixing prioritizing phase difference detection, though it is not shown in a figure.

FIG. 12 is a diagram showing an example of the vertical three-pixel mixing prioritizing image quality for the Gb divided pixels.

In the vertical three-pixel mixing for the Gb divided pixels, three Gb divided pixels adjoining in the vertical direction with row numbers (M+6i+3), (M+6i+5) and (M+6i+7) are added. The mixed pixels that have been added are arranged at a position of a central Gb divided pixel, that is, a position with the row number (M+6i+5).

In the vertical three-pixel mixing for the B divided pixels, three B divided pixels adjoining in the vertical direction with row numbers (M+6i+3), (M+6i+5) and (M+6i+7) are added similarly to the case of the Gb divided pixels. The mixed pixels that have been added are arranged at a position of a central B divided pixel, that is, a position with the row number (M+6i+5) similarly to the case of the Gb divided pixels.

As a result, arrangement of the mixed pixels is as shown in FIG. 13. FIG. 13 is a diagram showing a state in which mixed pixels obtained by the vertical three-pixel mixing prioritizing image quality are arranged at regular intervals in the vertical direction.

As shown in FIG. 4, the row numbers of the Gb mixed pixels and the B mixed pixels added by the vertical three-pixel mixing prioritizing phase difference detection are (M+6i+3). In comparison, as shown in FIG. 13, the row numbers of the Gb mixed pixels and the B mixed pixels added by the vertical three-pixel mixing prioritizing image quality are (M+6i+5). As for the row numbers of the R mixed pixels and the Gr mixed pixels are (M+6i+2) in both of FIGS. 4 and 13.

Therefore, in FIG. 13, since the mixed pixels are arranged at regular intervals in the horizontal direction, the Gr divided pixels and the Gb divided pixels used in combination in phase difference detection are at positions that are mutually distant in the horizontal direction, and accuracy of phase difference is reduced. However, since components corresponding to brightness signals are distributed in an image more uniformly because of the regular intervals, image quality can be improved.

Next, a second example of the mixing processing prioritizing image quality (vertical two-pixel mixing) will be described with reference to FIGS. 14 and 15. Note that vertical mixing of an even number of pixels equal to or larger than two is also performed according to a method described here.

Figure 14:
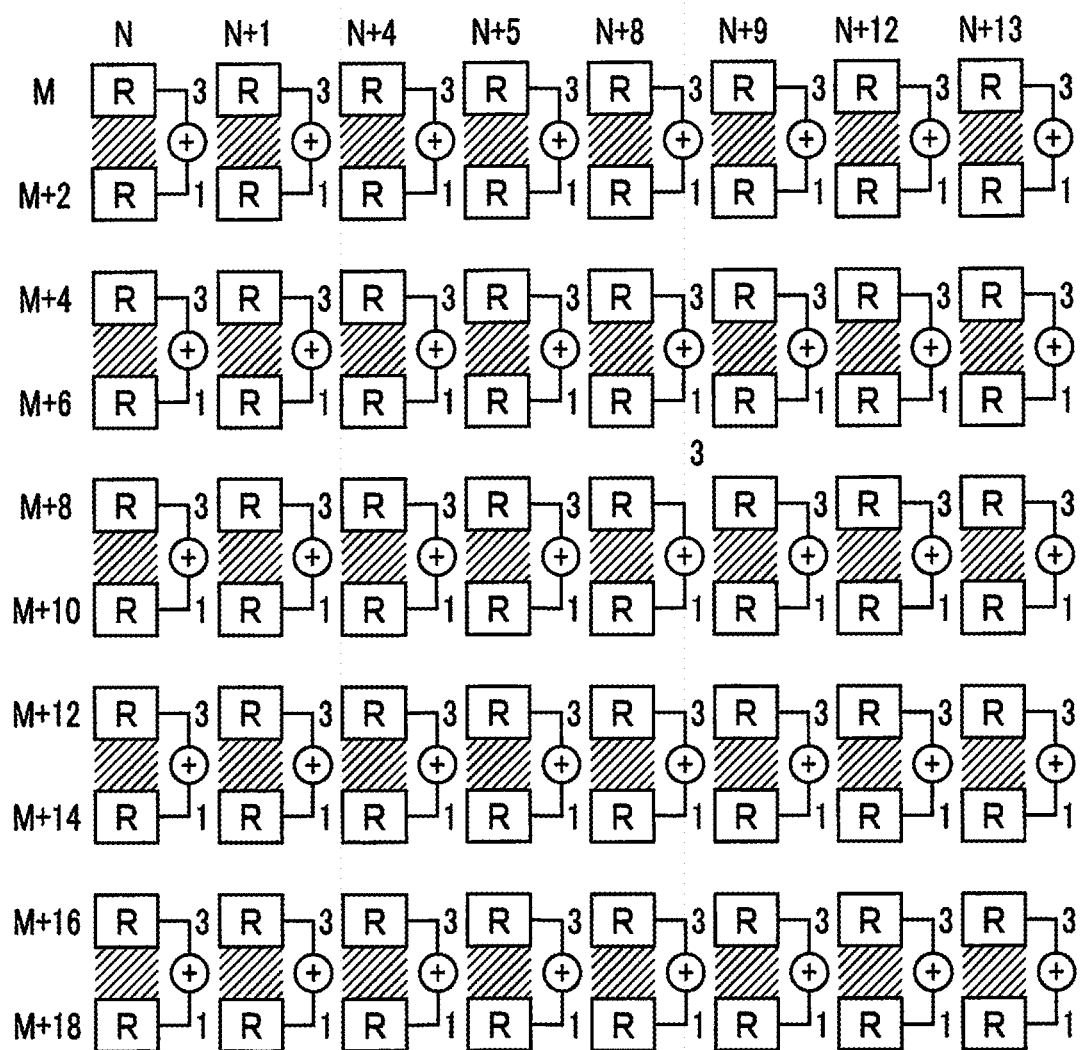
FIG. 14 is a diagram showing an example of performing vertical two-pixel mixing prioritizing image quality for the R divided pixels by weighted addition in the embodiment.

FIG. 14 is a diagram showing an example of performing the vertical two-pixel mixing prioritizing image quality for the R divided pixels by weighted addition. Note that it is the same as the above that a weight is specified from the mixing mode managing/instructing portion 14.

In the case of the vertical two-pixel mixing prioritizing image quality for the R divided pixels, two R divided pixels adjoining in the vertical direction with the same column number and with row numbers (M+4i) and (M+4i+2) are weightedly added at 3:1 as shown in FIG. 14. The mixed pixels that have been weightedly added are arranged substantially at an intermediate position indicated by hatching, that is, a position with the row number (M+4i+0.5).

In the vertical two-pixel mixing prioritizing image quality for the Gr divided pixels, two Gr divided pixels adjoining in the vertical direction with row numbers (M+4i) and (M+4i+2) are also weightedly added at 3:1 similarly to the vertical two-pixel mixing for the R divided pixels, though it is not shown in a figure. The mixed pixels that have been weightedly added are arranged at a position with the row number (M+4i+0.5).

Figure 15:
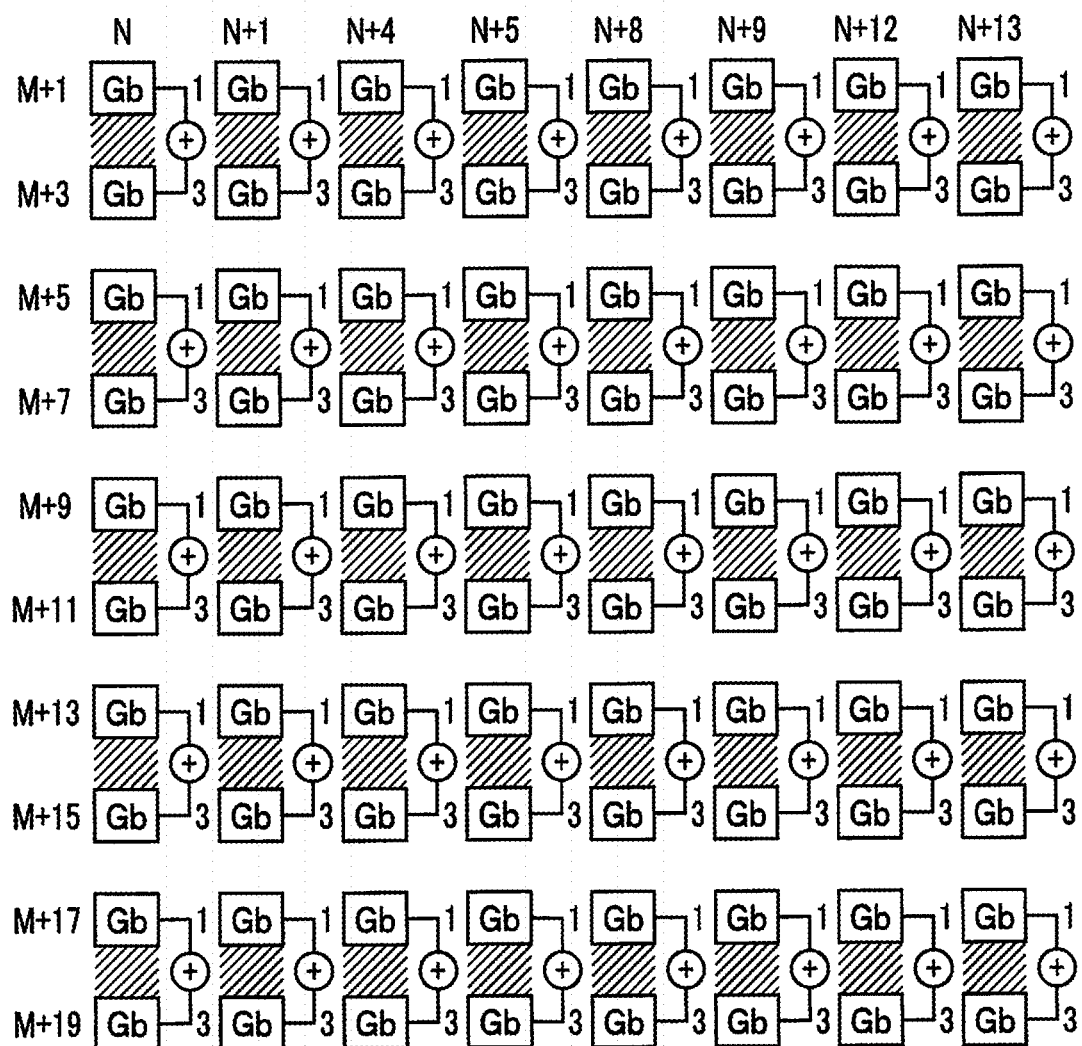
FIG. 15 is a diagram showing an example of performing the vertical two-pixel mixing prioritizing image quality for the Gb divided pixels by weighted addition in the embodiment.

FIG. 15 is a diagram showing an example of performing the vertical two-pixel mixing prioritizing image quality for the Gb divided pixels by weightedly adding.

In the vertical two-pixel mixing prioritizing image quality for the Gb divided pixels, two Gb divided pixels adjoining in the vertical direction with row numbers (M+4i+1) and (M+4i+3) are weightedly added at 1:3. The mixed pixels that have been weightedly added are arranged substantially at an intermediate position indicated by hatching, that is, a position with the row number (M+4i+2.5).

In the vertical two-pixel mixing prioritizing image quality for the B divided pixels, two B divided pixels adjoining in the vertical direction with row numbers (M+4i+1) and (M+4i+3) are also weightedly added at 3:1 similarly to the vertical two-pixel mixing for the Gb divided pixels, though it is not shown in a figure. The mixed pixels that have been weightedly added are arranged substantially at an intermediate position indicated by hatching, that is, a position with the row number (M+4i+2.5).

As a result of performing such processing, the R mixed pixels and the Gr mixed pixels are arranged at positions with the row number (M+4i+0.5), that is, positions with row numbers (M+0.5), (M+4.5), (M+8.5), . . . .

The Gb mixed pixels and the B mixed pixels are arranged at positions with the row number (M+4i+2.5), that is, positions with row numbers (M+2.5), (M+6.5), (M+10.5), . . . .

Therefore, rows of the R and Gr mixed pixels and rows of the Gb and B mixed pixels are separated at regular intervals by two pixels in the horizontal direction.

Since a third example of the mixing processing prioritizing image quality (horizontal three-pixel mixing) is similar to the third example of the mixing processing prioritizing phase difference detection (horizontal three-pixel mixing) described with reference to FIGS. 6 to 8, description is omitted.

Furthermore, since a fourth example of the mixing processing prioritizing image quality (horizontal two-pixel mixing) is similar to the fourth example of the mixing processing prioritizing phase difference detection (horizontal two-pixel mixing) described with reference to FIGS. 9 and 10, description is omitted.

Next, description will be made on an operation performed in a case where the image pickup apparatus 1 provided with the image pickup device 4 having pixels each of which is divided left and right as shown in FIG. 2 is, for example, a digital camera, with reference to FIGS. 16 to 20.

Figure 16:
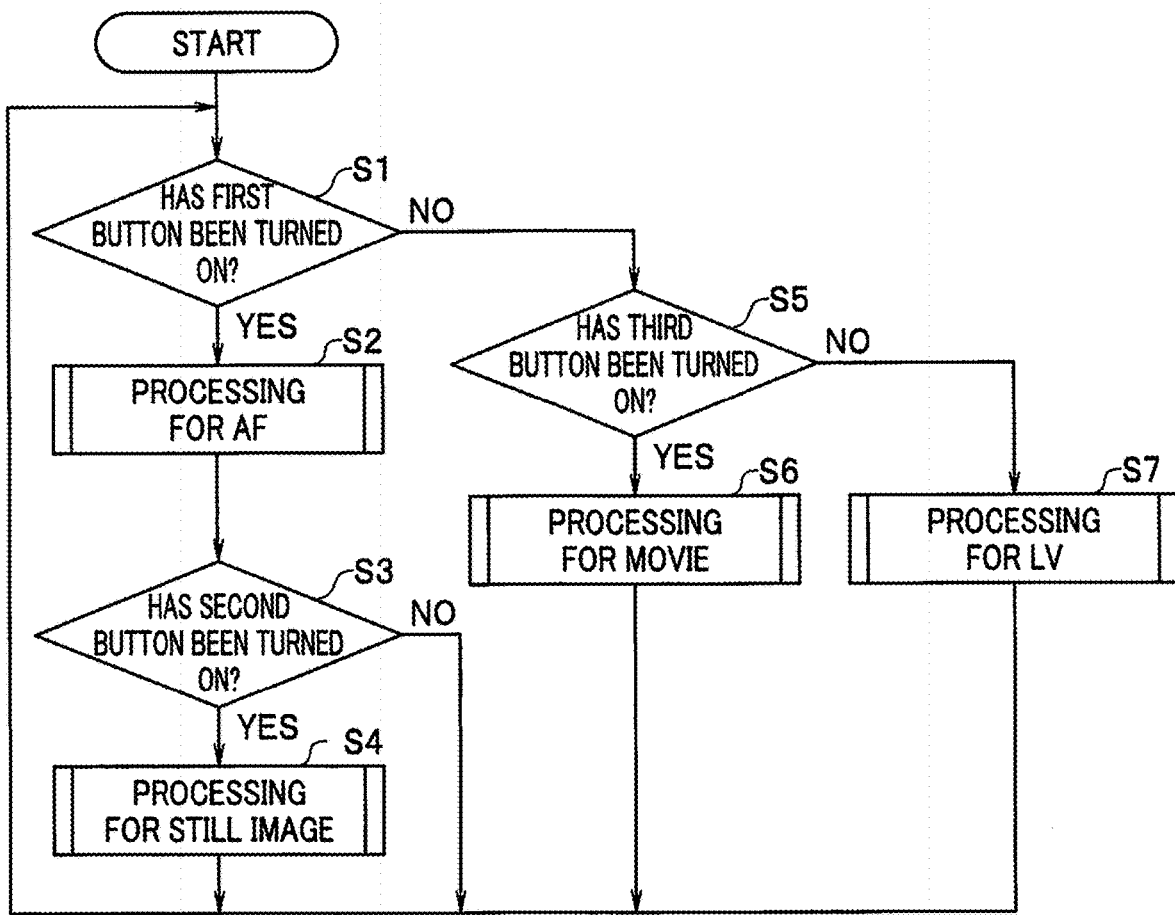
FIG. 16 is a flowchart showing operation of the image pickup apparatus of the embodiment at the time of performing shooting.

FIG. 16 is a flowchart showing operation of the image pickup apparatus 1 at the time of shooting. The operation at the time of shooting is performed in each portion in the image pickup apparatus 1 based on control by the system controlling portion 15.

For example, when the image pickup apparatus 1 is powered up, the process is entered after appropriate initial settings and the like are made.

Then, first, the system controlling portion 15 judges whether the first button (the first release) of the input IF 10 has been turned on or not (step S1).

Figure 17:
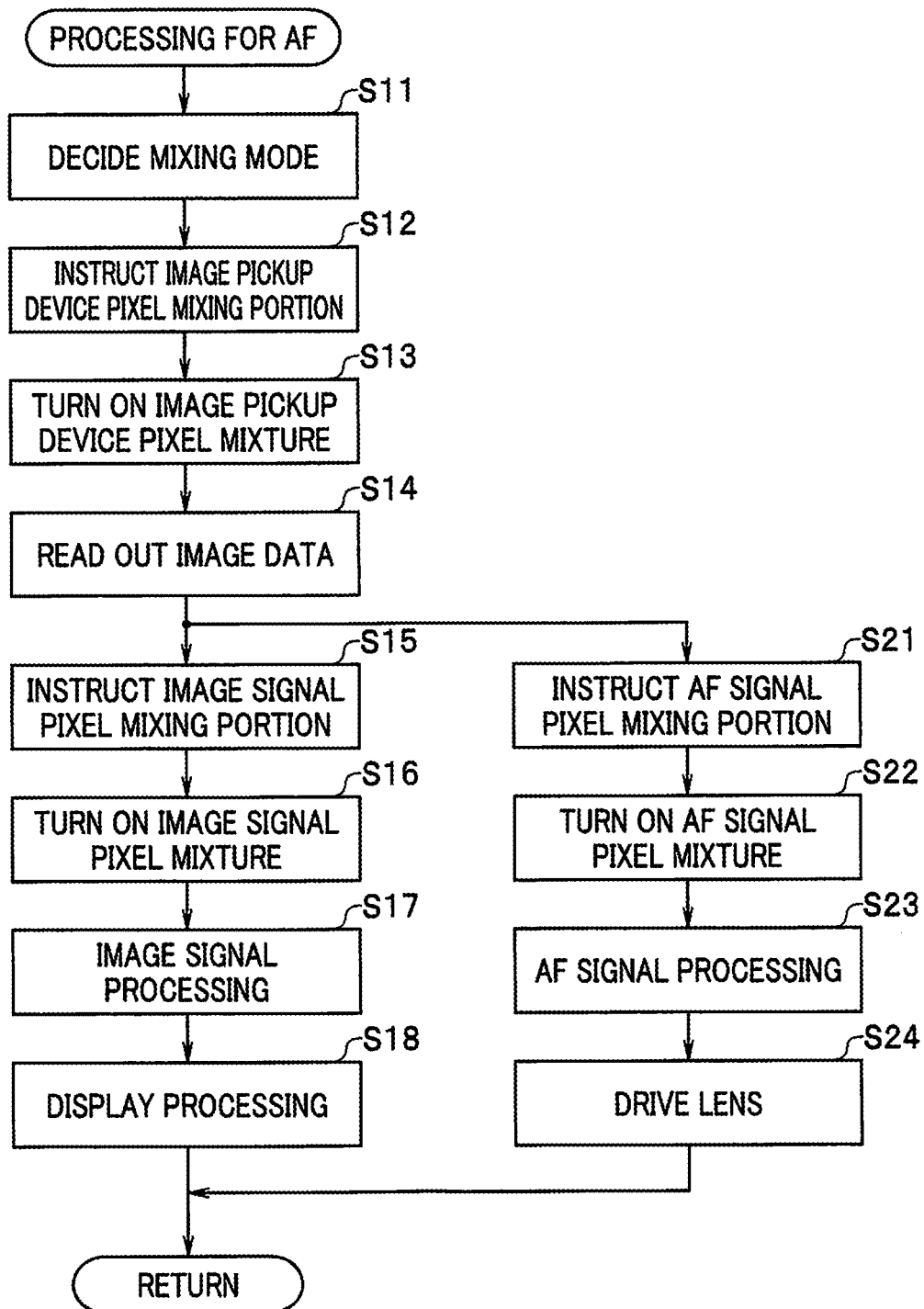
FIG. 17 is a flowchart showing processing for AF by the image pickup apparatus of the embodiment.

Here, if it is judged that the first button has been turned on, such processing for AF as is described later with reference to FIG. 17 is performed (step S2).

When the processing for AF ends, the system controlling portion 15 judges whether the second button (the second release) has been turned on or not next (step S3).

Figure 18:
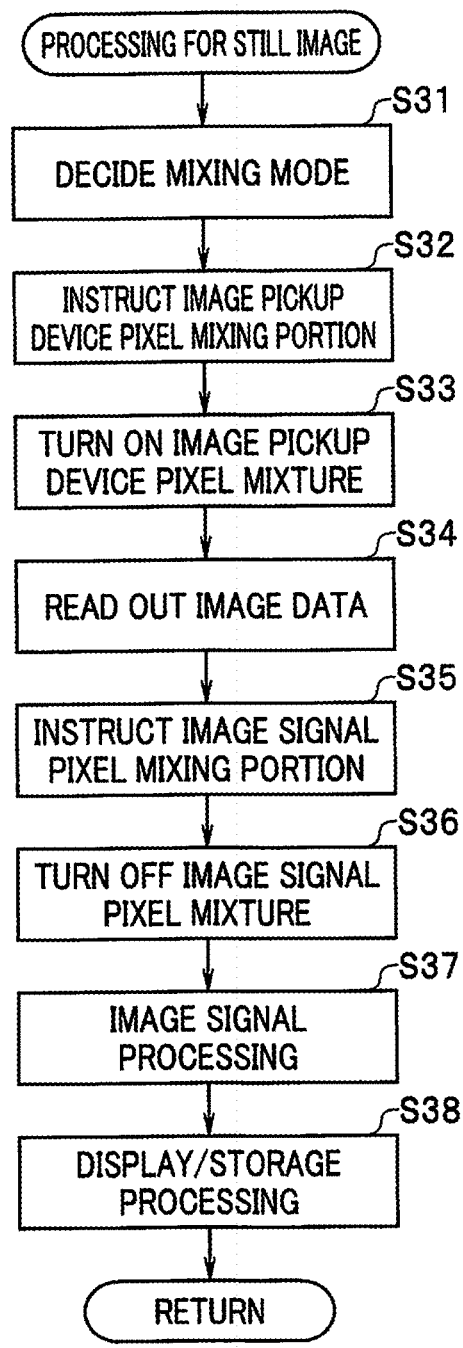
FIG. 18 is a flowchart showing processing for still image by the image pickup apparatus of the embodiment.

Here, if it is judged that the second button has been turned on, such processing for still image as is described later with reference to FIG. 18 is performed (step S4).

On the other hand, if it is judged at step S1 that the first button is off, the system controlling portion 15 judges whether the third button (the movie recording button) has been turned on or not (step S5).

Figure 19:
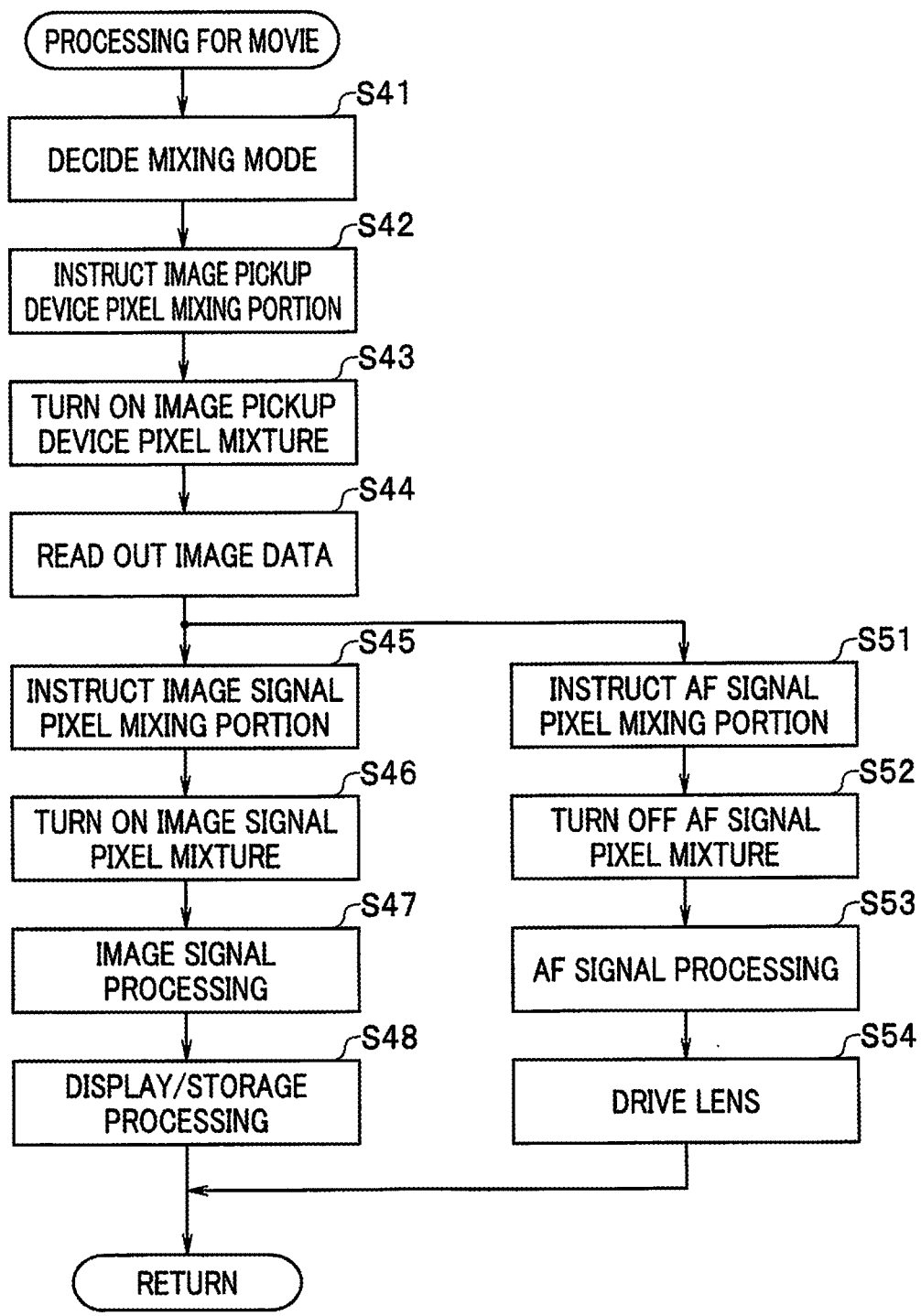
FIG. 19 is a flowchart showing processing for movie by the image pickup apparatus of the embodiment.

Here, if it is judged that the third button has been turned on, such processing for movie as is described later with reference to FIG. 19 is performed (step S6).

Figure 20:
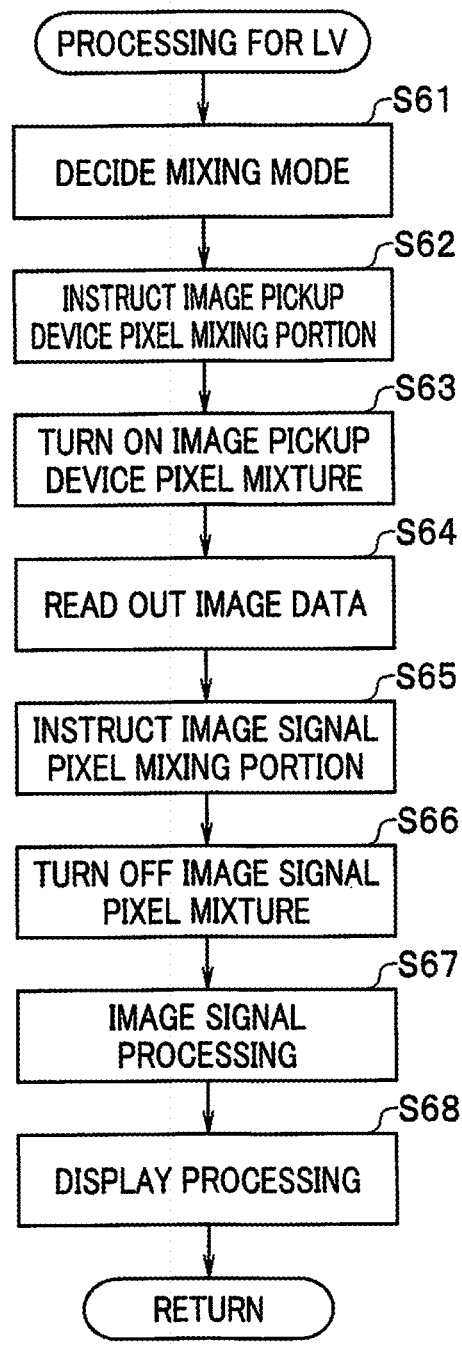
FIG. 20 is a flowchart showing processing for LV by the image pickup apparatus of the embodiment.

If it is judged at step S5 that the third button is off, such processing for LV (live view) as is described later with reference to FIG. 20 is performed (step S7).

If it is judged at step S3 described above that the second button is off, if the processing for still image of step S4 described above ends, if the processing for movie of step S6 described above ends, or if the processing for LV of step S7 described above ends, the flow returns to step S1, and the process as described above is repeatedly performed.

FIG. 17 is a flowchart showing the processing for AF by the image pickup apparatus 1.

When the process is entered at step S2 in FIG. 16, the mixing mode managing/instructing portion 14 receives information to the effect that the processing for AF has been entered, from the system controlling portion 15, and decides which mixing processing each of the image pickup device pixel mixing portion 11, the AF signal pixel mixing portion 12 and the image signal pixel mixing portion 13 should perform, from a viewpoint of prioritizing phase difference detection (step S11).

Then, the mixing mode managing/instructing portion 14 specifies a mixing method of the image pickup device pixel mixing portion 11 via the system controlling portion 15 (step S12).

In the processing for AF, the mixing method specified to the image pickup device pixel mixing portion 11 is, for example, as shown in FIG. 21, a process of performing vertical mixing as shown in FIGS. 3 and 4 (that is, addition is performed in a manner of obtaining closeness in the vertical direction in order to acquire phase difference information with a high accuracy) and not performing horizontal mixing (left-right addition is not performed as a matter of course) and the like. Here, FIG. 21 is a table showing classification of mixing processing according to AF, still image, movie and LV in the image pickup apparatus 1 of the present embodiment.

Classification of FIGS. 3 to 15 in terms of a mixing direction, the number of mixings, and whether arrangement at irregular intervals (distant/close arrangement) or arrangement at regular intervals is shown in FIG. 22. Here, FIG. 22 is a table showing correspondence between the mixing processing and each figure in the image pickup apparatus 1 of the present embodiment.

Therefore, the mixing mode managing/instructing portion 14, which is a controlling portion, performs control to cause pixel reduction of divided pixel signals of a plurality of divided pixels adjoining in the second direction to be performed so that processed pixel signals (mixed pixels) are not arranged at regular intervals in the second direction (in this example, the vertical direction) in the case of prioritizing phase difference detection, for at least the image pickup device pixel mixing portion 11, which is a pixel reducing portion in the device.

Then, image data generated by the pixel portion 4a is mixing-processed by the image pickup device pixel mixing portion 11 (step S13) and read out from the image pickup device 4 (step S14).

The image data read out from the image pickup device 4 is transmitted to each of the AF signal pixel mixing portion 12 and the image signal pixel mixing portion 13.

First, processing of the image data transmitted to the image signal pixel mixing portion 13 is performed as below.

The mixing mode managing/instructing portion 14 specifies a mixing method to the image signal pixel mixing portion 13 (step S15). The mixing method specified here includes left-right addition (see FIG. 21).

Therefore, the image signal pixel mixing portion 13 adds a left divided pixel and a right divided pixel of each pair of the same color to return the divided pixels to a normal pixel suitable for image signal processing (step S16).

An image signal obtained by mixing for image signal in this way is transmitted from the image signal pixel mixing portion 13 to the image signal processing portion 8, and such various kinds of image processing as are described above are performed (step S17).

The image-processed image signal is transmitted from the image signal processing portion 8 to the display portion 9 and displayed on the display portion 9 as an image (step S18).

Processing of the image data transmitted to the AF signal pixel mixing portion 12 is performed as below.

The mixing mode managing/instructing portion 14 specifies a mixing method to the AF signal pixel mixing portion 12 (step S21).

The mixing method specified to the AF signal pixel mixing portion 12 here is, for example, as shown in FIG. 21, to perform horizontal mixing as shown in FIGS. 6 to 8 without performing vertical mixing already performed by the image pickup device pixel mixing portion 11. It is, for example, for the purpose of improving S/N assuming a case where an object is dark that the horizontal mixing is further performed by the AF signal pixel mixing portion 12. Therefore, when an object is bright, the horizontal two-pixel mixing in FIGS. 9 and 10 may be performed instead of the horizontal three-pixel mixing in FIGS. 6 to 8. When an object is brighter, the horizontal mixing may not be performed.

Then, the AF signal pixel mixing portion 12 performs mixing processing of the image data received from the image pickup device 4 according to an instruction from the mixing mode managing/instructing portion 14 (step S22).

The image signal obtained by mixing for AF signal in this way is transmitted from the AF signal pixel mixing portion 12 to the AF signal processing portion 7, and processing such as differential operation is performed by the AF signal processing portion 7 to generate lens driving information (step S23).

The lens driving information generated by the AF signal processing portion 7 is transmitted to the system controlling portion 15, and driving control of the image pickup lens 2 by the system controlling portion 15 is performed for focusing (step S24).

When the processing of steps S18 and S24 has been performed, the flow returns from the processing.

FIG. 18 is a flowchart showing the processing for still image by the image pickup apparatus 1.

When the process is entered at step S4 in FIG. 16, the mixing mode managing/instructing portion 14 receives information to the effect that the processing for still image has been entered, from the system controlling portion 15, and decides which mixing processing each of the image pickup device pixel mixing portion 11, the AF signal pixel mixing portion 12 and the image signal pixel mixing portion 13 should perform, from a viewpoint that phase difference detection is unnecessary (image quality is prioritized) (step S31).

Then, the mixing mode managing/instructing portion 14 specifies a mixing method of the image pickup device pixel mixing portion 11 via the system controlling portion 15 (step S32).

In the processing for still image, the mixing method specified to the image pickup device pixel mixing portion 11 is, for example, as shown in FIG. 21, a process of performing left-right addition without performing vertical mixing or horizontal mixing. Since high image quality is required from a still image, neither vertical mixing nor horizontal mixing is performed to prevent reduction in the number of pixels. Further, since phase difference information is unnecessary at the time of shooting a still image, the number of pixels to be read out from the image pickup device 4 is reduced by performing left-right addition by the image pickup device pixel mixing portion 11 to shorten a readout time period.

Then, image data generated by the pixel portion 4a is mix-processed by the image pickup device pixel mixing portion 11, and, after adding a left divided pixel and a right divided pixel of each pair of the same color to return the divided pixels to a normal pixel (step S33), the image data is read out from the image pickup device 4 (step S34).

Since the processing for AF is unnecessary in the processing for still image, the image data read out from the image pickup device 4 is transmitted to the image signal pixel mixing portion 13 but is not transmitted to the AF signal pixel mixing portion 12.

As shown in FIG. 21, the mixing mode managing/instructing portion 14 instructs the image signal pixel mixing portion 13 to turn off the mixing operation (step S35). This is for the purpose of avoiding reduction in the number of pixels due to mixing processing as described above.

In response to the instruction, the image signal pixel mixing portion 13 turns off the mixing operation (step S36).

The image signal in a state of just having been outputted from the image pickup device 4 and not having been mix-processed by the image signal pixel mixing portion 13 is transmitted to the image signal processing portion 8 via the image signal pixel mixing portion 13 or directly, and such various kinds of image processing as are described above are performed (step S37).

The image-processed image signal is transmitted from the image signal processing portion 8 to the external memory 20 and stored, for example, as an image file (a still image file). The image signal is also transmitted to the display portion 9 and displayed as an image (step S38).

When the processing of step S38 has been performed, the flow returns from the processing.

FIG. 19 is a flowchart showing the processing for movie by the image pickup apparatus 1.

When the process is entered at step S6 in FIG. 16, the mixing mode managing/instructing portion 14 receives information to the effect that the processing for movie has been entered, from the system controlling portion 15, and decides which mixing processing each of the image pickup device pixel mixing portion 11, the AF signal pixel mixing portion 12 and the image signal pixel mixing portion 13 should perform, from a viewpoint of prioritizing image quality (prioritizing image quality to accuracy of phase difference detection though phase difference detection is necessary) (step S41).

Then, the mixing mode managing/instructing portion 14 specifies a mixing method of the image pickup device pixel mixing portion 11 via the system controlling portion 15 (step S42).

The mixing method specified to the image pickup device pixel mixing portion 11 in the processing for movie is, for example, as shown in FIG. 21, a process of performing vertical mixing as shown in FIGS. 14 and 15 (that is, arranging mixed pixels in the vertical direction at regular intervals to prioritize image quality) and performing horizontal mixing as shown in FIGS. 9 and 10 (mixed pixels in the horizontal direction are arranged at regular intervals) and the like (left-right addition is not performed as a matter of course because phase difference detection is necessary) (see FIG. 22).

Then, image data generated by the pixel portion 4a is mix-processed by the image pickup device pixel mixing portion 11 (step S43) and read out from the image pickup device 4 (step S44).

The image data read out from the image pickup device 4 is transmitted to each of the AF signal pixel mixing portion 12 and the image signal pixel mixing portion 13.

First, processing of the image data transmitted to the image signal pixel mixing portion 13 is performed as below.

The mixing mode managing/instructing portion 14 specifies a mixing method to the image signal pixel mixing portion 13 (step S45). The mixing method specified here includes left-right addition.

Therefore, the image signal pixel mixing portion 13 adds a left divided pixel and a right divided pixel of each pair of the same color to return the divided pixels to a normal pixel suitable for image signal processing (step S46).

An image signal obtained by mixing for image signal in this way is transmitted from the image signal pixel mixing portion 13 to the image signal processing portion 8, and such various kinds of image processing as are described above are performed (step S47).

The image-processed image signal is transmitted from the image signal processing portion 8 to the external memory 20 and stored, for example, as an image file (a movie file). The image signal is also transmitted to the display portion 9 and displayed as an image (step S48).

Processing of the image data transmitted to the AF signal pixel mixing portion 12 is performed as below.

For example, as shown in FIG. 21, the mixing mode managing/instructing portion 14 instructs the AF signal pixel mixing portion 12 to turn off the mixing operation (that is, to turn off vertical mixing and horizontal mixing) (step S51). This is because the vertical mixing and the horizontal mixing have already been performed by the image pickup device pixel mixing portion 11.

In response to the instruction, the AF signal pixel mixing portion 12 turns off the mixing operation (step S52).

The image signal in a state of just having been outputted from the image pickup device 4 and not having been mix-processed by the AF signal pixel mixing portion 12 is transmitted to the AF signal processing portion 7 via the AF signal pixel mixing portion 12 or directly, and processing such as differential operation is performed by the AF signal processing portion 7 to generate lens driving information (step S53).

The lens driving information generated by the AF signal processing portion 7 is transmitted to the system controlling portion 15, and driving control of the image pickup lens 2 by the system controlling portion 15 is performed for focusing (step S54).

When the processing of steps S48 and S54 has been performed, the flow returns from the processing.

FIG. 20 is a flowchart showing the processing for LV by the image pickup apparatus 1.

When the process is entered at step S7 in FIG. 16, the mixing mode managing/instructing portion 14 receives information to the effect that the processing for LV has been entered, from the system controlling portion 15, and decides which mixing processing each of the image pickup device pixel mixing portion 11, the AF signal pixel mixing portion 12 and the image signal pixel mixing portion 13 should perform, from a viewpoint that phase difference detection is unnecessary (image quality is prioritized) (step S61).

Then, the mixing mode managing/instructing portion 14 specifies a mixing method of the image pickup device pixel mixing portion 11 via the system controlling portion 15 (step S62).

In the processing for LV, the mixing method specified to the image pickup device pixel mixing portion 11 is, for example, as shown in FIG. 21, a process of performing vertical mixing as shown in FIGS. 11, 12 and 13 (that is, arranging mixed pixels in the vertical direction at regular intervals to prioritize image quality), performing horizontal mixing as shown in FIGS. 6, 7 and 8 (mixed pixels in the horizontal direction are arranged at regular intervals) and further performing left-right addition. As for an LV image, since it is necessary to secure a predetermined frame rate and a real-time property, the number of pixels to be read out from the image pickup device 4 and power consumption are reduced by performing vertical three-pixel mixing and horizontal three-pixel mixing in the image pickup device 4. In addition, since phase difference information is unnecessary at the time of shooting an LV image, the number of pixels to be read out from the image pickup device 4 is further reduced by performing left-right addition by the image pickup device pixel mixing portion 11 to further shorten a readout time period.

Then, image data generated by the pixel portion 4a is mix-processed by the image pickup device pixel mixing portion 11 (step S63) and read out from the image pickup device 4 (step S64).

Since the processing for AF is unnecessary in the processing for LV, the image data read out from the image pickup device 4 is transmitted to the image signal pixel mixing portion 13 but is not transmitted to the AF signal pixel mixing portion 12.

As shown in FIG. 21, the mixing mode managing/instructing portion 14 instructs the image signal pixel mixing portion 13 to turn off the mixing operation (step S65). This is because necessary mixing processing has already been performed by the image pickup device pixel mixing portion 11.

In response to the instruction, the image signal pixel mixing portion 13 turns off the mixing operation (step S66).

The image signal in a state of just having been outputted from the image pickup device 4 and not having been mix-processed by the image signal pixel mixing portion 13 is transmitted to the image signal processing portion 8 via the image signal pixel mixing portion 13 or directly, and such various kinds of image processing as are described above are performed (step S67).

The image-processed image signal is transmitted from the image signal processing portion 8 to the display portion 9 and displayed on the display portion 9 as an image (step S68).

When the processing of step S68 has been performed, the flow returns from the processing.

Note that description has been made above on phase difference detection (vertical line detection) in the horizontal direction, mainly with the first direction as the horizontal direction and the second direction as the vertical direction.

In this case, at the time of performing pixel reduction in the vertical direction prioritizing phase difference detection (vertical mixing or vertical decimation), processed pixel signals are not arranged at regular intervals in the vertical direction. Further, at the time of performing pixel reduction in the horizontal direction without performing pixel reduction in the vertical direction (horizontal mixing or horizontal decimation) or at the time of performing pixel reduction in the horizontal direction in addition to pixel reduction in the vertical direction, processed pixel signals are arranged at regular intervals in the horizontal direction similarly to general processing.

In comparison, in the case of performing phase difference detection in the vertical direction prioritizing phase difference detection (horizontal line detection), an idea similar to the above description can be applied when it is assumed that the first direction and the second direction are the vertical direction and the horizontal direction, respectively.

In other words, at the time of performing pixel reduction in the horizontal direction (horizontal mixing or horizontal decimation), processed pixel signals can be arranged not at regular intervals in the horizontal direction. Further, at the time of performing pixel reduction in the vertical direction (vertical mixing or vertical decimation) without performing pixel reduction in the horizontal direction or in the case of performing pixel reduction in the vertical direction in addition to pixel reduction in the horizontal direction, processed pixel signals can be arranged at regular intervals in the vertical direction similarly to general processing. Therefore, detailed description of horizontal line detection is omitted.

Note that though an example of providing, as pixel mixing portions which are pixel reducing portions, three pixel mixing portions of the image pickup device pixel mixing portion 11 (in-device mixture), the image signal pixel mixing portion 13 (mixture for image) and the AF signal pixel mixing portion 12 (mixture for AF) (an example of a combination of (4) below) has been described above, it is not necessarily required to provide all the three.

In the case of prioritizing phase difference detection, for example, combinations shown below are possible in order to perform pixel reduction of divided pixel signals of a plurality of divided pixels adjoining in the second direction so that processed pixel signals are not arranged at regular intervals in the second direction (○: OK; ×: NG).

|  | (1) | (2) | (3) | (4) | (5) |
|---|---|---|---|---|---|
| In-device mixing | ○ | ○ | ○ | ○ | × |
| Mixing for image | × | ○ | × | ○ | ○ |
| Mixing for AF | × | × | ○ | ○ | ○ |

Among the above combinations, it is the configuration of (5) (or when the image pickup device pixel mixing portion 11 is not caused to operate in the configuration of (4)) that, when divided pixels obtained being divided into in four in the up, down, left and right directions are used, it is possible to, for both of vertical line detection and horizontal line detection, prioritize phase difference detection in which processed pixel signals are not arranged at regular intervals in the second direction, and it is also possible to prioritize image quality.

More specifically, in this case, mixing processing is not performed at all in the image pickup device 4, and all pixels are outputted as they are. Then, the AF signal pixel mixing portion 12 can perform pixel reduction with the first direction and the second direction as the horizontal direction and the vertical direction, respectively, to generate processed pixel signals for vertical line detection and perform the vertical line detection; and, separately from the vertical line detection, the AF signal pixel mixing portion 12 can perform pixel reduction the first direction and the second direction as the vertical direction and the horizontal direction, respectively, to generate processed pixel signals for horizontal line detection and perform the horizontal line detection.

In this case, it is difficult to obtain the effects of improving the frame rate and reducing power consumption because all pixels are read out from the image pickup device 4. However, by performing mixing processing as pixel reduction in the AF signal pixel mixing portion 12, it is possible to improve sensitivity (S/N).

Note that though a Bayer array is given as an example of a basic array of pixels in the above description, the basic array of pixels is not limited to the Bayer array as described above.

Further, though the respective RGB pixels are given as an example of pixels with different spectral characteristics in the above description, the pixels with different spectral characteristics are not limited to RGB pixels. Complementary color pixels are also possible. White pixels may be included, and pixels of a plurality of colors equal to or more than three are also possible.

Furthermore, though phase difference detection is performed using signals of the G pixels, which are mainly responsible for brightness components, in the above description, phase difference detection may be performed after performing demosaicking processing to generate a brightness signal of each pixel position.

According to the present embodiment, in the case of prioritizing phase difference detection, pixel reduction of divided pixel signals is performs such that processed pixel signals are not arranged at regular intervals in the second direction, and, therefore, it is possible to cause processed pixel signals of a kind used for phase difference detection to be arranged at short intervals in the second direction, and it is possible to effectively suppress misdetection based on a different object. Thus, it is possible to reduce the number of pixels and improve phase difference detection accuracy.

Further, in the case of not prioritizing phase difference detection, processed pixels signals are arranged at regular intervals in the second direction, and, therefore, components corresponding to brightness signals are distributed in an image more uniformly, so that image quality can be improved.

Furthermore, since processed pixels signals are arranged at regular intervals in the first direction, image quality in the first direction can be improved irrespective of whether or not to prioritize phase difference detection.

If pixel reduction is performed such that processed pixel signals are not arranged at regular intervals in the second direction, by the image pickup device pixel mixing portion 11 which is an in-device pixel reducing portion, the number of pixels to be read out from the image pickup device 4 can be reduced, and, therefore, readout is performed at a high speed, and it is possible to reduce power consumption.

In addition, by performing at least either mixing or decimation as pixel reduction, complicated operation processing becomes unnecessary, and it becomes possible to maintain the high speed of processing.

Further, because gravity center positions of processed pixel signals are set by specifying positions of a plurality of divided pixels targeted to be mixed, it becomes possible to, in the image pickup device 4 which is, for example, of an addressing type capable of specifying a readout row and a readout pixel, favorably perform processing in the device.

Furthermore, in the case of setting gravity center positions of processed pixel signals by specifying a mixture ratio of a plurality of divided pixel signals, only four basic arithmetic operations of addition, subtraction, multiplication and division are required, and, therefore, it is possible to perform processing at a high speed in any of the image pickup device pixel mixing portion 11, the AF signal pixel mixing portion 12 and the image signal pixel mixing portion 13.

In the case of setting positions of processed pixel signals by specifying positions of divided pixels left without being targeted to be decimated, and performing pixel reduction, even the four basic arithmetic operations also become unnecessary, and a processing load is reduced more.

Note that each of the portions described above may be configured as a circuit. An arbitrary circuit may be implemented as a single circuit or as a combination of a plurality of circuits if the circuit can perform the same function. Furthermore, an arbitrary circuit is not limited to a circuit configured as a dedicated circuit for performing an intended function but may be in a configuration in which an intended function is performed by causing a general-purpose circuit to execute a processing program. A processor configured as hardware may perform processing of each portion as processing steps.

Though description has been made above mainly on an image pickup apparatus, an image pickup method for performing processing similar to the processing of the image pickup apparatus is also possible. A processing program for causing a computer to perform processing similar to the processing of the image pickup apparatus, a computer-readable non-transitory recording medium in which the processing program is recorded, and the like are also possible.

The present invention is not limited to the embodiment described above as it is, and the components can be modified and embodied within a range not departing from the spirit of the invention at a stage of practicing the invention. Further, various aspects of the invention can be formed by appropriate combinations of a plurality of components disclosed in the above embodiment. For example, some components may be deleted from all the components shown in the embodiment. Furthermore, components of different embodiments may be appropriately combined. Thus, it goes without saying that various modifications and applications are possible within a range not departing from the spirit of the invention.

What is claimed is:

1. An image pickup apparatus comprising:
 a pixel portion where a plurality of kinds of pixels with different spectral characteristics are arranged in a first direction and a second direction vertical to the first direction as repetition of a basic array, and an arbitrary pixel is divided into a plurality of divided pixels at a plurality of division positions in the first direction, wherein the plurality of divided pixels correspond to a plurality of different microlenses;

a pixel reducing circuit configured to reduce a number of pixels by generating processed pixel signals from image data generated by all divided pixels existing in the pixel portion by performing pixel reduction of divided pixel signals of a plurality of adjoining divided pixels related to a same kind and a same division position; and a controlling circuit configured to control the pixel reduction by the pixel reducing circuit according to whether or not to prioritize phase difference detection; wherein in a case of prioritizing the phase difference detection, the controlling circuit controls the pixel reducing circuit to cause the pixel reducing circuit to perform pixel reduction of divided pixel signals of a plurality of divided pixels adjoining in the second direction so that the processed pixel signals are not arranged at regular intervals in the second direction.

2. The image pickup apparatus according to claim 1, wherein in a case of not prioritizing the phase difference detection but causing the pixel reduction of the divided pixel signals of the plurality of divided pixels adjoining in the second direction to be performed, the controlling circuit controls the pixel reducing circuit so that the processed pixel signals are arranged at regular intervals in the second direction.

3. The image pickup apparatus according to claim 1, wherein in a case of causing pixel reduction of divided pixel signals of a plurality of divided pixels adjoining in the first direction irrespective of whether or not to prioritize the phase difference detection, the controlling circuit controls the pixel reducing circuit so that the processed pixel signals are arranged at regular intervals in the first direction.

4. The image pickup apparatus according to claim 1, wherein
the pixel portion is provided in an image pickup device;
the pixel reducing circuit comprises an in-device pixel reducing circuit provided in the image pickup device; and
the controlling circuit performs the control to cause the pixel reduction of the divided pixel signals of the plurality of divided pixels adjoining in the second direction to be performed so that the processed pixel signals are not arranged at regular intervals in the second direction in the case of prioritizing the phase difference detection, at least for the in-device pixel reducing circuit.

5. The image pickup apparatus according to claim 1, wherein the pixel reducing circuit performs at least one of mixing and decimation as the pixel reduction.

6. The image pickup apparatus according to claim 5, wherein in a case where the pixel reducing circuit performs the pixel reduction by mixing, the controlling circuit sets gravity center positions of the processed pixel signals by specifying positions of a plurality of divided pixels targeted to be mixed.

7. The image pickup apparatus according to claim 6, wherein the controlling circuit sets the gravity center positions of the processed pixel signals by further specifying a mixture ratio of divided pixel signals of the plurality of divided pixels targeted to be mixed.

8. The image pickup apparatus according to claim 5, wherein, in a case where the pixel reducing circuit performs the pixel reduction by decimation, the controlling circuit sets positions of the processed pixel signals by specifying positions of divided pixels left without being targeted to be decimated.

9. The image pickup apparatus according to claim 2, wherein, in a case of causing pixel reduction of divided pixel signals of a plurality of divided pixels adjoining in the first direction irrespective of whether or not to prioritize the phase difference detection, the controlling circuit controls the pixel reducing circuit so that the processed pixel signals are arranged at regular intervals in the first direction.

10. An image pickup method comprising:
reducing the number of pixels by generating processed pixel signals from image data generated by all divided pixels by performing pixel reduction of divided pixel signals of a plurality of adjoining divided pixels related to a same kind and a same division position, wherein the divided pixels correspond to a plurality of different microlenses; and the image data being outputted from a pixel portion where a plurality of kinds of pixels with different spectral characteristics are arranged in a first direction and a second direction vertical to the first direction as repetition of a basic array, and an arbitrary pixel is divided into a plurality of divided pixels at a plurality of division positions in the first direction; and
controlling the pixel reduction by the reducing of a number of pixels, according to whether or not to prioritize phase difference detection; wherein
in a case of prioritizing the phase difference detection, the controlling is to control the pixel reduction to cause pixel reduction of divided pixel signals of a plurality of divided pixels adjoining in the second direction to be performed so that the processed pixel signals are not arranged at regular intervals in the second direction.

11. An image pickup method for use in an image pickup device having a pixel portion in which a plurality of kinds of pixels with different spectral characteristics are arranged in a first direction and a second direction orthogonal to the first direction as repetition of a basic array, and in which an arbitrary pixel is divided into a plurality of divided pixels at a plurality of division positions in the first direction, the image pickup method comprising:
determining whether or not to prioritize phase difference detection over image quality; and
responsive to determining to prioritize phase difference detection over image quality, performing pixel reduction of divided pixel signals of a plurality of divided pixels (1) adjoining in the first direction so that the processed pixel signals are arranged at regular intervals in the first direction, and (2) adjoining in the second direction so that the processed pixel signals are not arranged at regular intervals in the second direction, and
otherwise, responsive to determining not to prioritize phase difference detection over image quality, performing pixel reduction of divided pixel signals of a plurality of divided pixels (1) adjoining in the first direction so that the processed pixel signals are arranged at regular intervals in the first direction, and (2) adjoining in the second direction so that the processed pixel signals are arranged at regular intervals in the second direction.

12. The image pickup method of claim 11 wherein it is determined to prioritize phase difference detection over image quality during autofocus processing.

13. The image pickup method of claim 11 wherein it is not determined to prioritize phase difference detection over image quality during any of still image processing, movie processing, and live view processing.

\* \* \* \* \*